US007511105B2

(12) United States Patent
Chung

(10) Patent No.: US 7,511,105 B2
(45) Date of Patent: Mar. 31, 2009

(54) ONE-POT PROCESS AND REAGENTS FOR PREPARING LONG CHAIN BRANCHED POLYMERS

(75) Inventor: Tze-Chiang Chung, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 370 days.

(21) Appl. No.: 11/170,698

(22) Filed: Jun. 29, 2005

(65) Prior Publication Data

US 2006/0004156 A1  Jan. 5, 2006

Related U.S. Application Data

(60) Provisional application No. 60/584,838, filed on Jul. 1, 2004.

(51) Int. Cl.
C08F 4/6192 (2006.01)
C08F 210/06 (2006.01)
C08F 12/06 (2006.01)
C08F 12/34 (2006.01)
C08F 8/18 (2006.01)
C08F 8/30 (2006.01)
C08F 257/00 (2006.01)

(52) U.S. Cl. .................... 526/160; 526/347; 526/347.1; 526/348; 526/239; 526/279; 525/242; 525/319; 525/355; 525/379; 525/384; 525/386

(58) Field of Classification Search ................. 526/160, 526/347, 347.1, 348, 239, 279; 525/242, 525/319, 355, 379, 384, 386
See application file for complete search history.

(56) References Cited

U.S. PATENT DOCUMENTS

| 4,340,705 A | 7/1982 | Lal et al. ..................... 526/139 |
| 4,551,503 A | 11/1985 | Lal et al. .................. 525/332.1 |
| 4,751,276 A | 6/1988 | Chung ......................... 526/158 |
| 5,047,485 A | 9/1991 | DeNicola, Jr. .............. 525/387 |
| 5,272,236 A | 12/1993 | Lai et al. ................. 526/348.5 |
| 5,286,800 A | 2/1994 | Chung et al. ................ 525/288 |
| 5,362,814 A * | 11/1994 | Machida et al. ............ 525/324 |
| 5,401,805 A | 3/1995 | Chung et al. ................ 525/288 |
| 5,504,171 A | 4/1996 | Etherton et al. ............ 526/336 |
| 5,541,236 A | 7/1996 | DeNicola, Jr. et al. ...... 522/157 |
| 5,543,484 A | 8/1996 | Chung et al. ............. 526/347.1 |
| 5,608,009 A | 3/1997 | Machida et al. ............ 525/247 |
| 5,670,595 A | 9/1997 | Meka et al. ................. 526/336 |
| 5,731,362 A | 3/1998 | Scheve et al. ............... 521/142 |
| 5,866,659 A | 2/1999 | Chung et al. ................ 525/279 |
| 5,929,185 A | 7/1999 | Rosch et al. ................ 526/336 |
| 5,939,495 A | 8/1999 | Kioka et al. ................ 525/356 |
| 6,077,907 A | 6/2000 | Raetzsch et al. ........... 525/191 |
| 6,096,849 A | 8/2000 | Chung et al. ................ 526/336 |
| 6,197,910 B1 | 3/2001 | Weng et al. ................. 526/351 |
| 6,248,837 B1 | 6/2001 | Chung et al. ................ 525/245 |
| 6,265,493 B1 | 7/2001 | Chung et al. ................ 525/247 |
| 6,313,228 B1 | 11/2001 | Huber et al. ................ 525/263 |
| 6,414,102 B2 | 7/2002 | Chung et al. ................ 526/336 |
| 6,479,600 B2 | 11/2002 | Chung et al. ................ 526/160 |

OTHER PUBLICATIONS

Soga, K., Uozumi, T., Nakamura, S., Toneri, T., Teranishi, T., Sano, T., Arai, T., "Structures of polyethylene and copolymers of ethylene with 1-octene and oligoethylene produced with the Cp2ZrCl2 and [(C5Me4)SiMe2N(t-Bu)]TiCl2 catalysts," Macromol. Chem. Phys., vol. 197, Issue 12 (1996), 4237-4251.

Chung, T.C., Dong, J.Y., "A Novel Consecutive Chain Transfer Reaction to p-Methylstyrene and Hydrogen during Metallocene-Mediated Olefin Polymerization," J. Am. Chem. Soc., vol. 123, No. 21 (2001), 4871-4876.

Chung, T.C., Xu, G., Yingying, L., Hu, Y., "Metallocene-Mediated Olefin Polymerization with B-H Chain Transfer Agents: Synthesis of Chain-End Functionalized Polyolefins and Diblock Copolymers," Macromolecules, vol. 34 (2001), 8040-8050.

Soga et al., "Structures of polyethylene and copolymers of ethylene with 1-octene and oligoethylene produced with the Cp2ZrCl2 and [(C5Me4)SiMe2N(t-Bu)]TiCl2 catalysts," Macromol. Chem. Phys., vol. 197, Issue 12, pp. 4237-4251, 1996.

Graessley, "Effect of Long Branches on the Flow Properties of Polymers," Acc. Chem. Res. 1977, 10, 332.

Weng et al., "Long Chain Branched Isotactic Polypropylene," Macromolecules 2002, vol. 35, No. 10, 3838-3843.

Dong et al., "Synthesis of Polyethylene Containing a Terminal p-Methylstyrene Group: Metallocene-Mediated Ethylene Polymerization with a Consecutive Chain Transfer Reaction to p-Methylstyrene and Hydrogen," Macromolecules, vol. 35, No. 5, 1622-1631, 2002.

Gahleitner, "Melt rheology of polyolefins," Prog. Polym. Sci. 26 (2001) 895-944.

Wang et al., "Kinetics of Long Chain Branching in Continuous Solution Polymerization of Ethylene Using Constrained Geometry Metallocene," Macromolecules, vol. 31, No. 25, 8677-8683, 1998.

Jacovic et al., "A Rheological Study of Long Branching in Polyethylene by Blending," J. App Poly Sci., vol. 23, 517-527 (1979).

Shiono et al., "Copolymerization of poly(propylene) macromonomer with ethylene by (tert-butanamide)dimethyl(tetramethyl-n5-cyclopentadienyl)silanetitanium dichloride/methylalminoxane catalyst," Macromol. Chem. Phys., vol. 198, 3229-3237 (1997).

(Continued)

*Primary Examiner*—Roberto Rábago
(74) *Attorney, Agent, or Firm*—Gifford, Krass, Sprinkle, Anderson & Citkowski, P.C.

(57) ABSTRACT

A one-pot polymerization process of preparing long chain branching polymers is provided. Also described is a "T" reagent that serves as a link between main and side chains of an inventive long chain branching polymer. A "T" reagent has at least two functionalities, serving as both co-monomer and chain transfer reaction agent. Optionally, a copolymerization reaction between an alpha-olefin and "T" reagent takes place initially to incorporate some "T" molecules in the polyolefin main chain, and the incorporated "T" units then behave as chain transfer agents for reacting with the propagating polyolefin chains to form side chains. In a particular embodiment, a polymerization process for preparing long chain branching polyethylene (LCBPE) and long chain branching polypropylene (LCBPP) is detailed.

18 Claims, 5 Drawing Sheets

OTHER PUBLICATIONS

Lu et al., "Synthesis of Long Chain Branched Polypropylene with Relatively Well-Defined Molecular Structure," Macromolecules, vol. 32, No. 25, 8678-8680 (1999).

Weng, et al., "Synthesis of vinyl-terminated isotactic poly(propylene)," Macromol. Rapid Commun. 2000, 21, 1103-1107.

Shiono et al., "Copolymerization of Atactic Polypropene Macromonomer with Propene by an Isospecific Metallocene Catalyst," Macromolecules, vol. 32, 5723-5727 (1999).

Weng et al., "Synthesis of Long-Chain Branched Propylene Polymers via Macromonomer Incorporation," Macromol. Rapid Commun., vol. 22, 1488-1492 (2001).

Kolodka et al., "Copolymerization of Propylene with Poly-(ethylene-co-propylene) Macromonomer and Branch Chain-Length Dependence of Rheological Properties," Macromolecules, vol. 35, No. 27, 10062-10070 (2002).

Xu et al., "Borane Chain Transfer Agent in Metrallocene-Mediated Olefin Polymerization. Synthesis of Borane-Terminated Polyethylene and Diblock Copolymers Containing Polyethylene and Polar Polymer," J. Am. Chem. Soc., vol. 121, No. 28, 6763-6764 (1999).

Xu et al., Synthesis of Syndiotactic Polystyrene (s-PS) Containing a Terminal Polar Group and Diblock Copolymers Containing a s-PS and Polar Polymers, Macromolecules, vol. 32, No. 25, 8689-8692 (1999).

Chung et al., "A Novel Consecutive Chain Transfer Reaction to p-Methylstyrene and Hydrogen during Metallocene-Mediated Olefin Polymerization," vol. 123, No. 21, 4873 (2001).

Fu et al., "Silanes as Chain Transfer Agents in Metallocene-Mediated Olefin Polymerization. Facile in Situ Catalytic Synthesis of Silyl-Terminated Polyolefins," J. Am. Chem. Soc., vol. 117, No. 43, 10747-10748 (1995).

Koo et al., "Organolanthanide-Mediated Silanolytic Chain Transfer Processes. Scope and Mechanism of Single Reactor Catalytic Routes to Silapolyolefins," Macromolecules, vol. 32, No. 4, 981-988 (1999).

* cited by examiner

ONE-POT PROCESS AND REAGENTS FOR PREPARING LONG CHAIN BRANCHED POLYMERS

REFERENCE TO RELATED APPLICATION

This application claims priority of U.S. Provisional Patent Application Ser. No. 60/584,838, filed Jul. 1, 2004, which is incorporated herein by reference in its entirety.

FIELD OF THE INVENTION

The invention relates to long chain branching polymers, methods and reagents useful in the synthesis thereof. In one embodiment, the invention relates to a one-pot polymerization process of preparing long chain branching polyolefins including long chain branching polypropylene.

BACKGROUND OF THE INVENTION

A long chain branching (LCB) polymer is a polymer containing one or more side chain branches whose length is comparable to or longer than a critical entanglement length. Compared with a linear polymer having the same molecular weight, a long chain branched polymer shows high shear sensitivity, zero shear viscosity, melt elasticity, and high impact strength (Graessley, *Acc. Chem. Res.* 1977, 10, 332; Bersted, et al. *J. Applied Polym. Sci.* 1981, 26, 1001; Roovers, Macromolecules 1991, 24, 5895). LCB polymers exhibit higher viscosities at low shear rates and lower viscosities at high shear rates. Shear thinning is advantageous in polymer processing, such as under high shear conditions. Further, high melt strength, that is, increasing resistance to stretching during elongation of the molten material, is a desirable mechanical property which is important in thermoforming, extrusion coating, and blow molding processes involving predominately elongational flows.

Polyolefins produced with single-site catalysts, such as metallocene and non-metallocene catalyst systems, generally have relatively narrow molecular weight distribution characterized by a polydispersity index of about 2. This narrow distribution leads to superior mechanical properties, but worsens processibility because of the lack of shear thinning. On the other hand, polyolefins produced with traditional Ziegler-Natta catalysts, which contain multiple active sites, show broad molecular weight distribution with good processibility characteristics, such as shear thinning, but with undesirable mechanical properties.

Polypropylene is a commonly used polyolefin, nearly ubiquitous in modern industrial use. Polypropylene is particularly desirable as a high quality plastic because it can be purified to a high degree and it is resistant to microbial growth, making it an excellent material for use in medical applications and in the semiconductor industry. Further, as a lightweight, chemical and heat resistant material, polypropylene is useful in manufacture of diverse packaging materials, textiles and consumer items. However, commercial polypropylene (PP) products, normally isotactic, semi-crystalline thermoplastics, prepared by Ziegler-Natta or metallocene catalysts, have a predominantly linear molecular structure. Although linear PP polymers have many desirable physical properties, they show a variety of melt processing shortcomings, especially the metallocene-prepared ones having narrow molecular weight distributions. The low melt strength causes local thinning in melt thermoforming, relative weakness in large-part blow molding, the onset of edge weave during high speed extrusion coating of paper or other substrates, and flow instabilities in coextrusion of laminate structures. As a result, PP has been limited in some end-use fabrications, for example, extrusion coating, blow molding, profile extrusion, and thermoforming.

One way to improve the processing deficiency of such polymers is to introduce long chain branches to polymers. However, there are a number of problems remaining to be overcome in this area. For example, an in situ, or one-pot, process for LCB polymer synthesis is desirable to address economic and environmental concerns regarding polymer synthesis.

Furthermore, despite intense interest and many research attempts, so far there is no commercially viable process for preparing long chain branched polypropylene (LCBPP).

In a direct polymerization process, one major difficulty of in situ preparing LCBPP polymers is due to the complicated PP macromonomer structures. There are two possible monomer insertion modes (including 1,2- and 2,1-insertions) and multiple chain termination mechanisms that can lead to polypropylene with various chain ends (Weng, et al. Macromol. Rapid Commun. 2000, 21, 1103), while only the vinyl chain end is effective for LCB formation. Furthermore, the preparation of the most important isotactic polypropylene requires iso-specific catalysts, such as rac-Me$_2$Si[2-Me-4-Ph(Ind)]$_2$ZrCl$_2$/MAO, which have limited special opening at the active site for incorporating macromonomers. Therefore, it is extremely difficult to find a catalyst system that can accommodate all the requirements, namely in situ formation of a significant amount of vinyl-terminated PP macromonomers and further incorporation of macromonomers into LCBPP structure.

In addition, under some reaction conditions, a small portion of the incorporated diolefin units might engage double enchainment, and the increase of cross-over structures in the polymer results in unprocessible (crosslinked) polymer network.

Thus, there is a continuing need for LCB polymers as well as methods and reagents for use in their synthesis.

SUMMARY OF THE INVENTION

A process for forming a long chain branching polymer is provided wherein the polymer has the formula:

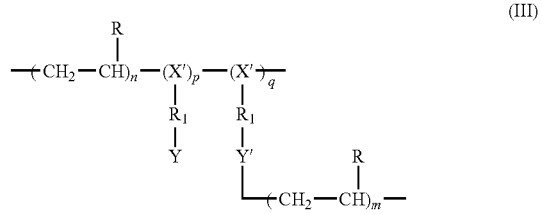

where each R is independently H or a C1-C30 substituted or unsubstituted, linear, branched, or cyclic alkyl or aryl moiety, n is an integer between 500 and 100,000, inclusive, m is an integer between 100 and 50,000, inclusive, X' is a residue of a moiety X, where X is a terminal vinyl or norbornene group reactive under polymerization conditions, Y is a chain transfer agent, Y' is a residue of Y, R1 is a C0 to C10 substituted or unsubstituted, linear, branched, or cyclic alkyl or aryl, q is an integer in the range from 1-500, inclusive, and p is an integer in the range from 0-1,000, inclusive.

An inventive process includes providing an alpha-olefin monomer and a "T" reagent. A "T" reagent has the formula:

X—R$_1$—Y, where X is a terminal vinyl or norbornene group reactive under polymerization conditions, R1 is C0 to C10 substituted or unsubstituted, linear, branched, or cyclic alkyl or aryl, and Y is a chain transfer agent. An inventive process further includes providing a catalyst and mixing the olefin monomer, the "T" reagent, and the catalyst in a container to yield a reaction mixture. The reaction mixture is allowed to react under polymerization conditions for a period of time sufficient to form a long chain branching polymer.

Preferably an inventive synthetic process is an in situ (one-pot) process, carried out in a single vessel.

In one example, Y is a chain transfer agent including a moiety such as a styrene, an alkylbenzene, an organoborane, an organosilane, an alkylaluminum, an alkylzinc, or a thiophene moiety.

Exemplary "T" reagents include p-(3-butenyl)styrene/hydrogen, p-(ethylnorborenyl)styrene/hydrogen, 5-hexenylalkylboron hydride, ethylnorborenylalkylboron hydride, 5-hexenyldialkylsilicon hydride, and ethylnorborenyldialkylsilicone hydride.

Optionally, the reaction mixture further comprises a diluent, such as an aliphatic hydrocarbon, an aromatic hydrocarbon or a combination thereof.

An inventive process may further include a graft polymerization reaction of an inventive long chain branching polymer and a monomer to yield an inventive graft polymer. Such a graft polymerization reaction may include a graft-from, a graft-onto or a graft-through polymerization reaction.

An inventive process optionally further includes a cross-linking reaction of the long chain branching polymer to yield a cross-linked polymer and a functionalization reaction of the long chain branching polymer to yield a polymer having a pendant functional group.

Further provided is an inventive long chain branching polymer having the formula:

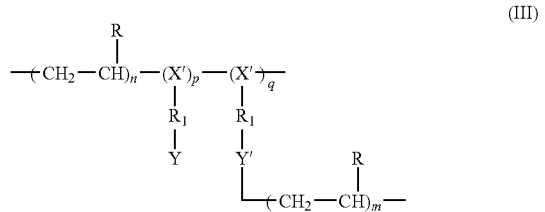

(III)

where each R is independently H or a C1-C30 substituted or unsubstituted, linear, branched, or cyclic alkyl or aryl moiety, n is an integer between 500 and 100,000, inclusive, m is an integer between 100 and 50,000, inclusive, X' is a residue of a moiety X, where X is a terminal vinyl or norbornene group reactive under polymerization conditions, Y is a chain transfer agent, Y' is a residue of Y, R1 is a C0 to C10 substituted or unsubstituted, linear, branched, or cyclic alkyl or aryl, q is an integer in the range from 1-500, inclusive, and p is an integer in the range from 0-1,000, inclusive.

In one embodiment, the long chain branching polymer is a long chain branched polyethylene. In a further example, the long chain branching polymer is a long chain branched polypropylene.

An inventive long chain branching polymer has any of the known stereo-structures: atactic, syndiotactic, isotactic, hemiisotactic and isotactic stereoblock. In a particular embodiment, an isotactic long chain branching polymer is preferred, particularly an isotactic long chain branching polypropylene.

Also provided is a long chain branched polypropylene has a melting temperature higher than 140° C.

Use of a dual function "T" reagent for use in polymer synthesis is detailed which has the formula: X—R$_1$—Y, where X is a terminal vinyl or norbornene group reactive under polymerization conditions, R1 is C0 to C10 substituted or unsubstituted, linear, branched, or cyclic alkyl or aryl moiety, and Y is a chain transfer agent.

Further described is a process of synthesizing a long-chain branching olefin polymer including providing an olefin monomer, providing a T reagent having the formula: X—R$_1$—Y, where X is a terminal vinyl or norbornene group, R$_1$ is a C0-C10 linear, branched, or cyclic alkyl or aryl and where Y is a chain transfer agent; and co-polymerizing the olefin monomer and the T reagent. Preferably an inventive synthetic process is carried out in a single vessel without removing the reactants therefrom prior to the polymerization. Optionally, polymerization is initiated by a catalyst, preferably a transition metal coordination.

DETAILED DESCRIPTION OF THE INVENTION

Figure 1:
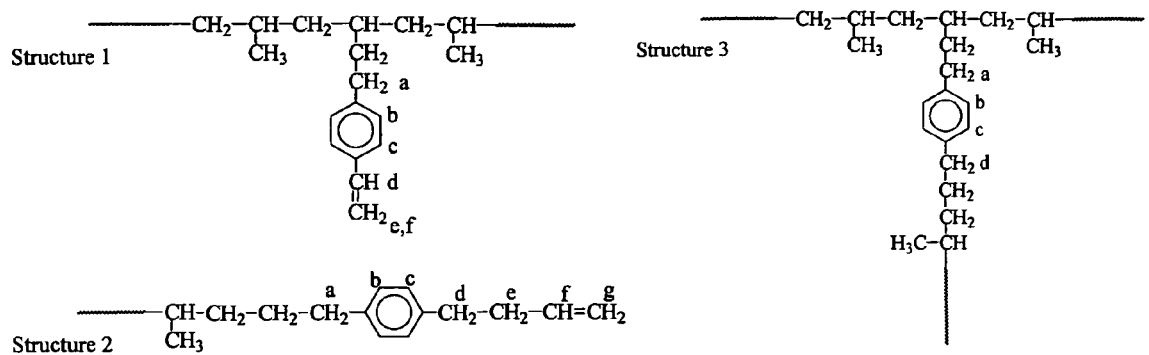
FIG. 1 shows a typical $^1$H NMR spectrum of LCBPP polymer (Sample 3)
Figure 1:
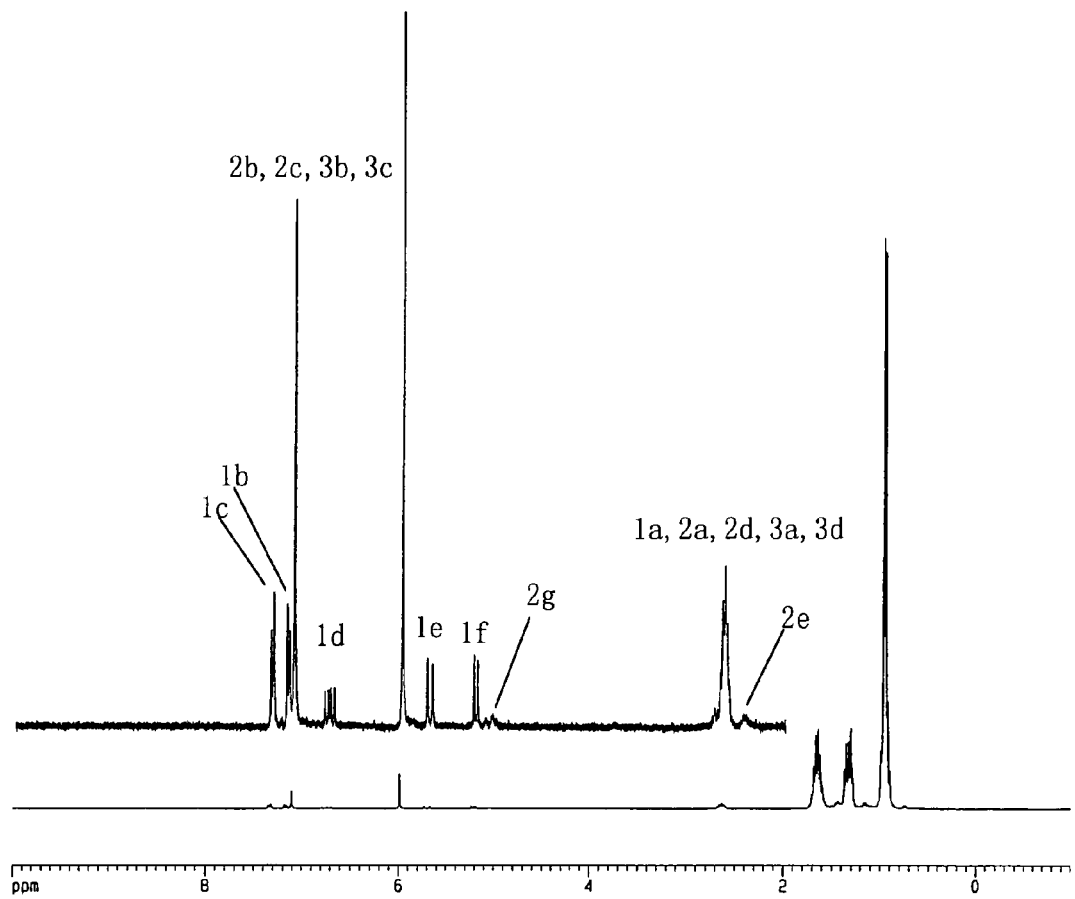

A long chain branching (LCB) polymer is a polymer containing one or more side chain branches whose length is comparable to or longer than a critical entanglement length. Long chain branching (LCB) polyolefins have significant advantages in industrial applications, providing shear thinning, an advantage in polymer processing, and high melt strength, important in thermoforming, extrusion coating, and blow molding processes among others.

Long chain branching (LCB) polyolefin compositions and methods for their synthesis are provided according to the present invention. Further, an inventive "T" reagent for use in the synthesis of a long chain branching polymer is detailed. A polymerization of the present invention is facilitated by the use of a novel reagent referred to as a "T" reagent. The reagent co-polymerizes with an olefin monomer. In addition, the "T" reagent functions to promote chain transfer insofar as it includes a reactive portion which functions as a chain transfer reagent and which causes branching of the polymer chain. The present invention is directed to methods of polymerization utilizing the reagent, as well as to the novel reagent itself, and to novel polymers prepared according to the present invention.

The present invention discloses a polymerization process for preparing long chain branching (LCB) polyolefins that contain a main chain and one or more side chains. Optionally and preferably, an inventive method is an in situ (one-pot) polymerization process. The resulting LCB polymers are processible in melt or solution and exhibit shear thinning and high melt strength.

Equation 1 illustrates a general reaction scheme for synthesis of an inventive LCB polyolefin (III) by an inventive method.

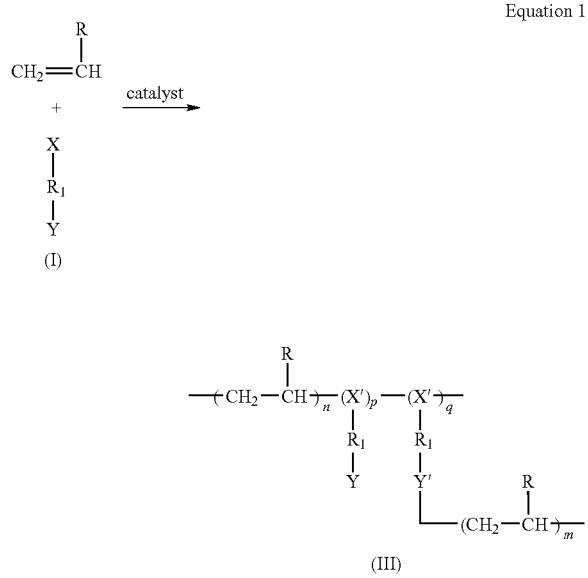

In the embodiment of an inventive process illustrated in Equation 1, an olefin monomer and a "T" reagent (I) are combined and reacted in the presence of a catalyst to yield an LCB polyolefin (III). The in situ process of forming an LCB polyolefin structure specifically utilizes a novel "T" reagent, which serves as both co-monomer and chain transfer agent in the synthesis. The incorporated "T" reagent units are junction points between polyolefin main and side chains in an inventive LCB polymer. X' and Y' shown in the polymer composition (III) are the residues of X and Y respectively, following polymer synthesis.

An olefin monomer can be any olefin or mix of olefins, particularly an alpha-olefin having a terminal vinyl group reactive under polymerization conditions. For example, an alpha olefin monomer includes a linear, branched or cyclic aliphatic alpha-olefin having from 2 to about 30 carbon atoms. A cyclic olefin monomer includes monomers having more than one ring illustratively including a bicyclic monomer. Exemplary preferred olefin monomers include used to prepare the polyolefin main and/or side chains of LCB polyolefins include ethylene, propylene, 1-butene, 1-pentene, 1-hexene, 1-heptene, 1-octene, 1-nonene, 1-decene, 3-methyl-1-butene, 4-methyl-1-pentene, 3-methyl-1-pentene, 4-methyl-1-hexene, 3,3-dimethyl-1-butene, 4,4-dimethyl-1-hexene, norbornene, phenylnorbornene, indanylnorbornene, and vinylidenenorbornene. These monomers can be used either singly or as a combination of two or more monomers.

A "T" reagent can be represented by the following formula:

A "T" reagent shown at (I) includes the moiety X which includes a terminal vinyl or norbornene group. The moiety X in each "T" reagent is very reactive in transition metal-mediated alpha-olefin polymerization to incorporate a "T" reagent into a polyolefin main chain structure. $R_1$ is $C_0$ to $C_{10}$ substituted or unsubstituted, linear, branched, or cyclic alkyl or aryl. In a preferred embodiment, $R_1$ is $C_2$ to $C_6$ substituted or unsubstituted, linear, branched, or cyclic alkyl or aryl, and most preferably $R_1$ is $C_2$ to $C_4$ substituted or unsubstituted, linear, branched or cyclic alkyl. A "T" reagent further includes a moiety Y which is a chain transfer agent. In particular, Y is a chain transfer agent which is a reducing agent, capable of releasing a hydride itself or in combination with a separate hydride source. A separate hydride source illustratively includes hydrogen. Reactive chain transfer agents are known and include a dialkylborane, exemplified in U.S. Pat. No. 6,248,837, p-methylstyrene/hydrogen, exemplified in U.S. Pat. No. 6,479,600), organoborane, organosilane, alkylaluminium, alkylzinc, and thiophene, among others. The Y moiety in the incorporated "T" molecule is involved in a chain transfer reaction with the propagating polymer side chain to form a linkage between the side chain and polymer main chain through the "T" molecule in one embodiment of an inventive process.

Exemplary preferred "T" reagents include: p-(3-butenyl)styrene/hydrogen (IV), p-(ethylnorborenyl)styrene/hydrogen (V), 5-hexenylalkylboron hydride (VI), ethylnorborenylalkylboron hydride (VII), 5-hexenyldialkylsilicon hydride (VIII), ethylnorborenyldialkylsilicone hydride (IX). Their molecular structures are shown below.

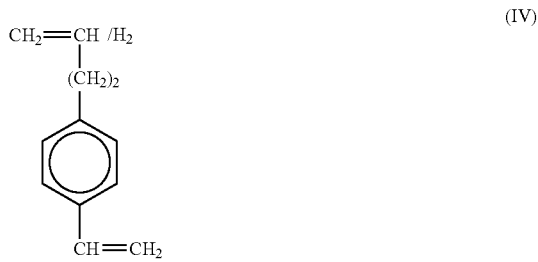

-continued

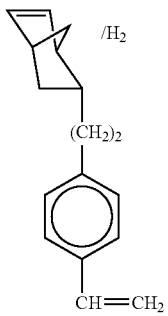
(V)

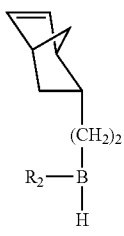
(VII)

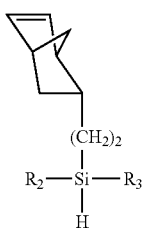
(IX)

in which $R_2$ and $R_3$ are each independently $C_1$ to $C_{12}$ substituted or unsubstituted, linear, branched, or cyclic alkyl or aryl. Preferably $R_2$ and $R_3$ are each independently $C_1$ to $C_8$ substituted or unsubstituted, linear, branched, or cyclic alkyl or aryl, and most preferably $R_2$ and $R_3$ are $C_1$ to $C_6$ substituted or unsubstituted, linear, branched, or cyclic alkyl or aryl.

The use of hydrogen in conjunction with a "T" reagent is optional. It is appreciated that "T" reagents IV and V shown above are preferably used in the presence of hydrogen as noted in examples detailed herein.

Catalysts useful in processes according to the invention include both homogeneous and heterogeneous catalyst systems, including Ziegler-Natta, metallocene, and non-metallocene catalysts.

A catalyst useful in an inventive method can perform both a copolymerization of alpha-olefin or norbornene moieties and a chain transfer reaction with chain transfer agent such as included in an inventive "T" reagent. In one embodiment, both functions can be performed simultaneously.

Such a catalyst is preferably a transition metal coordination catalyst capable of olefin polymerization which may be used for the in situ preparation of LCB polyolefins. Exemplary suitable transition metal coordination catalysts include homogeneous, heterogeneous, and supported single-site catalysts. Catalysts of this type include the active ionic complex shown in the following formula:

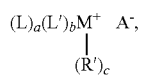

wherein L is a ligand such as cyclopentadienyl, substituted cyclopentadienyl, amido, phosphido, a sterically hindering alpha-diimine group or the like, or a bridged ligand having a covalent bridging group (such as silane, methyl and dimethyl groups) between two ligands; L' is selected from hydride, halo, alkyl, aryl, aryloxy, and alkoxy; a and b, independently, are 0, 1 or 2; R' is a hydride or hydrocarbon having from 1 to 20 carbon atoms; and c is 1 or 2. M is a transition metal of Groups IIIB to VIIB and VIII of the Periodic Table.

An exemplary catalyst is a Bronsted acid salt with a non-coordinating anion.

Particularly suitable catalysts are metallocene complexes of a Group IVB and VB metal, such as titanium, zirconium and hafnium, with a specific bridged cyclopentadienyl or substituted cyclopentadienyl structure.

The moiety $A^-$ is a non-coordinating, compatible anion. Particularly suitable anions are those derived from methylaluminoxane (MAO) and borates, such as tetra(pentafluorophenyl)borate and methyltri(pentafluorophenyl)borate.

The ionic catalyst species useful in inventive methods may be prepared by methods known in the art. For example, they may be prepared by combining (a) a transition metal compound of the Groups IIIB to VIIB and VIII of the Periodic Table and (b) a compound capable of reacting with a transition metal compound to form an ionic complex. In the reaction of compounds (a) and (b), the compound (a) forms a cation formally having a coordination number that is one less than its valence, and the compound (b) becomes a non-coordinating, compatible anion.

An inventive method yields a long chain branching (LCB) polyolefin composition having the formula (H) shown above in Equation 1 and reproduced here:

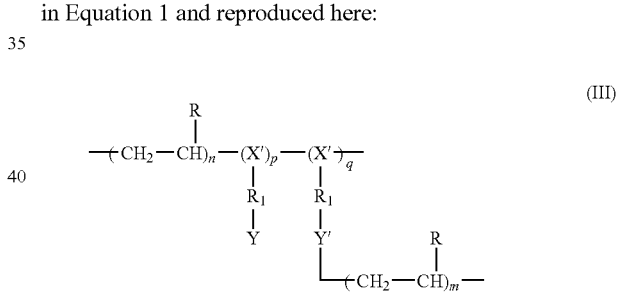
(III)

In this formula each R is independently H or a $C_1$-$C_{30}$ substituted or unsubstituted, linear, branched, or cyclic alkyl or aryl moiety. Preferably, each R is independently selected from H or a $C_1$-$C_{10}$ substituted or unsubstituted, linear, branched, or cyclic alkyl or aryl moiety, and most preferably each R is independently selected from H or $C_1$ to $C_6$ substituted or unsubstituted, linear, branched, or cyclic alkyl or aryl moiety. The R groups in main chain and side chains can be the same or different. The average number of repeating olefinic units (n) in the main chain is between 500 and 100,000. Preferably, n is between 800 and 10,000, and most preferably n is between 1,000 and 5,000. The average number of repeating olefinic units (m) in each side chain is between 100 and 50,000. Preferably, m is between 150 and 10,000, and most preferably m is between 200 and 5,000. The moiety X' is the residue of X after incorporation of the "T" reagent in a polymer. The Y moiety shown in the polymer composition (III) is the Y described above as included in a "T" reagent. The moiety Y' shown in the polymer composition (III) is the residue of Y after a chain transfer reaction incorporating a side chain. $R_1$ is the moiety $R_1$ described above as included in "T" reagent, that is, a $C_0$ to $C_{10}$ substituted or unsubstituted, linear, branched, or cyclic alkyl or aryl. In a preferred embodiment, $R_1$ is a $C_2$ to $C_6$ substituted or unsubstituted, linear, branched, or cyclic alkyl or aryl, and most preferably $R_1$ is a $C_2$ to $C_4$ substituted or unsubstituted, linear or branched alkyl moiety. The branching number (q) is at least 1, and preferably between 2 and 50, and most preferably between 2 and 20, and (p) can be zero or the number up to 1,000.

It will be recognized by one of skill in the art that the schematic structure illustrating an exemplary inventive long chain branched polymer is not intended to be limited to a structure in which the subunits repeating (n), (p), and (q) are present only in the order shown. For example, a portion of the repeating olefinic units (n) may be interspersed between p and q.

An inventive LCB polyolefin stereo-structure can be any of the five types of tacticity known for polyolefins, namely: atactic, syndiotactic, isotactic, hemiisotactic and isotactic stereoblock. Polyolefin stereo-structure is controlled by the identity of the catalyst used.

A specific example of an inventive LCB polyolefin including polypropylene (PP) is presented at (IV'), showing an LCB polypropylene.

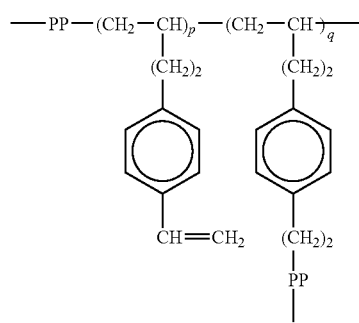

(IV')

An exemplary inventive long chain branched polypropylene (LCBPP) produced according to an inventive process, has q of at least 1, and preferably between 2 and 50, and most preferably between 2 and 20. The average number of repeating propylene units in the main chain is between 500 and 100,000. Preferably, the average number of repeating propylene units in the main chain is between 800 and 10,000, and most preferably the average number of repeating propylene units in the main chain is between 1,000 and 5,000. The average number of repeating propylene units in each side chain is between 100 and 50,000, preferably between 150 and 10,000. It will be recognized by one of skill in the art that the schematic structure illustrating an exemplary inventive long chain branched polypropylene is not intended to be limited to a structure in which the subunits PP, p, and q are present in the order shown. For example, PP may be interspersed between p and q.

In a preferred embodiment, an inventive LCBPP produced by an inventive process has an isotactic steroregular structure.

In a preferred embodiment, an inventive LCBPP produced by an inventive process has a melting temperature higher than 140° C.

In a further example, an inventive LCB polyolefin is a long chain branched polyethylene (LCBPE), wherein q is at least 1, and preferably between 2 and 50, and most preferably between 2 and 20. The average number of repeating olefinic units (n) in the main chain is between 500 and 100,000. Preferably, n is between 800 and 10,000, and most preferably n is between 1,000 and 5,000. The average number of repeating olefinic units (m) in each side chain is between 100 and 50,000. Preferably, m is between 150 and 10,000.

Without wishing to be bound by theory, a general reaction scheme of an inventive process may be represented by the following:

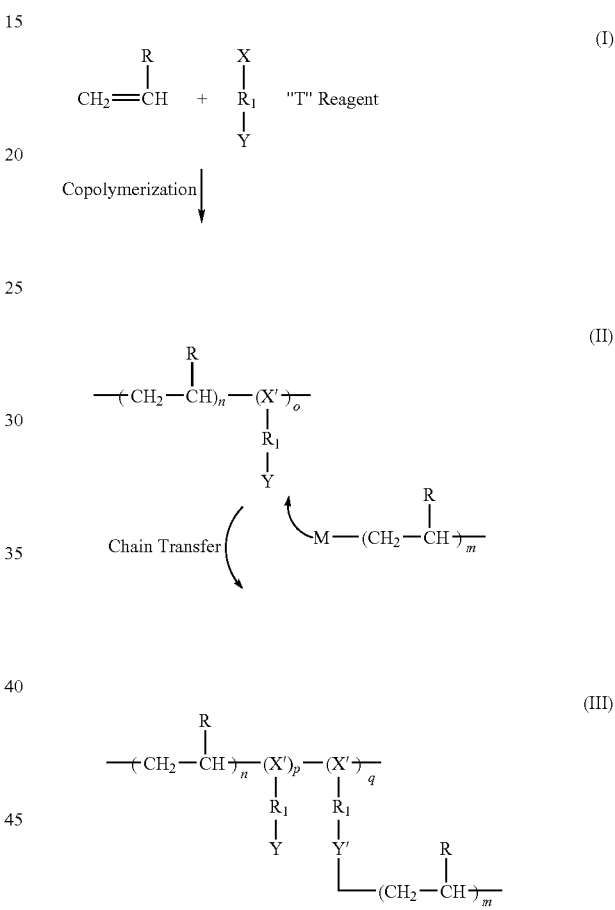

each R is independently H or a $C_1$-$C_{30}$ substituted or unsubstituted, linear, branched, or cyclic alkyl or aryl moiety. Preferably, each R is independently selected from H or a $C_1$-$C_{10}$ substituted or unsubstituted, linear, branched, or cyclic alkyl or aryl moiety, and most preferably each R is independently selected from H or $C_1$ to $C_6$ substituted or unsubstituted, linear, branched, or cyclic alkyl or aryl moiety. The R groups in main chain and side chains can be the same or different. The average number of repeating olefinic units (n) in the main chain is between 500 and 100,000. Preferably, n is between 800 and 10,000, and most preferably n is between 1,000 and 5,000. The average number of repeating olefinic units (m) in each side chain is between 100 and 50,000. Preferably, m is between 150 and 10,000, and most preferably m is between 200 and 5,000. The moiety X' is the residue of X after incorporation of the "T" reagent in a polymer. The Y moiety shown in the polymer composition (III) is the Y described above as included in a "T" reagent. The moiety Y' shown in the polymer composition (III) is the residue of Y after a chain transfer reaction incorporating a side chain. $R_1$ is the moiety $R_1$ described above as included in "T" reagent, that is, a $C_0$ to $C_{10}$ substituted or unsubstituted, linear, branched, or cyclic alkyl or aryl. In a preferred embodiment, $R_1$ is a $C_2$ to $C_6$ substituted or unsubstituted, linear, branched, or cyclic alkyl or aryl, and most preferably $R_1$ is a $C_2$ to $C_4$ substituted or unsubstituted, linear or branched alkyl moiety. The number (o) of "T" molecules incorporated in copolymer (II) is the sum of numbers (p) and (q), representing the unbranched and branched "T" units, respectively, in the resulting LCB polymer (III). The number (o) is at least 1, and preferably between 2 and 100, and most preferably between 2 and 50, q is at least 1, and preferably between 2 and 50, and most preferably between 2 and 20, and p can be zero or the number (o-q). X is selected from alpha-olefin and norborene moieties. Y is a chain transfer agent, and Y' is the residue after chain transfer reaction. The character "M" in the above reaction is a transition metal of Groups IIIB to VIIB and VIII of the Periodic Table.

In general, the polymerization reactions of the present invention are carried out by mixing "T" reagent with alpha-olefin monomer, in the presence of the catalyst and optionally a diluent, in a reactor, under polymerization conditions. In a preferred embodiment, polymerizations conditions include controlling the reaction temperature such that the temperature is between about 0 and 80° C., inclusive, preferably maintaining constant pressure, and thorough mixing. Reaction times range from about 30 seconds to about 24 hours.

In a highly preferred embodiment, an inventive polymerization process is an in situ (one-pot) polymerization wherein the synthesis is carried out in a single vessel.

In a particular embodiment, the polymerization may be carried out under batch conditions, such as in an inert gas atmosphere and in the substantial absence of moisture. Preferably, the polymerization is carried out continuously in a typical continuous solution, slurry, or gas phase polymerization process, which is usually equipped with inlet pipes for monomers, catalysts and diluents, temperature sensing means, and an effluent overflow to a holding drum or quench tank. The overall residence time can vary, depending upon such variables as catalyst activity and concentration, monomer concentration, reaction temperature, monomer conversion and desired molecular weight, and generally will be between about thirty minutes and five hours.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane or the like. The processes of the present invention can be carried out in the form of slurry of polymer formed in the diluents employed, or as a homogeneous solution process, depending on the alpha-olefin used. The use of a slurry process is, however, preferred, since in that case lower viscosity mixtures are produced in the reactor, and slurry concentrations up to 40 weight % of polymer are possible.

The subsequent in situ chain transfer reaction not only incorporates polyolefin side chains but also regenerates a catalytic site, such that the transition metal catalyst can maintain high catalyst activity.

In one embodiment, the chain transfer reaction may be performed before copolymerization.

In accordance with another embodiment of the invention, a long chain branching polyolefin such as (III) can be used alone or physically mixed with polyolefin that has the same main or side chain of the long chain branching polyolefin (III), for instance in a polymer composition to be used in a manufacturing process. A small concentration of long chain branching polymer can greatly enhance processibility and melt strength of the corresponding polymer with narrow molecular weight distribution. Furthermore, the long chain branching polyolefin (III) can be further chemically modified by taking the advantage of the existing unbranched "T" units that contain several reactive Y groups. The Y groups in long chain branching polyolefin (III) can easily engage many reactions, including crosslinking, functionalization, and graft reactions, under mild reaction conditions. Such reactions with Y do not change main and side chains in long chain branching polyolefin such as (III), but greatly enhance performance, such as adhesion, compatibility, paintability, and mechanical strength.

In one embodiment, an inventive LCB polyolefin includes pendant groups, preferably along the backbone, which are reactive in many chemical reactions, including free radical, cationic, anionic and transition metal coordination reactions. These groups can serve as the reactive sites for selective crosslinking and/or functionalization reactions to produce functionalized LCB polymers. Furthermore, these groups can further serve as the monomers, initiators, chain transfer agents for graft reactions to produce modified LCB polymer structures containing additional polymer side chains. The versatility of an inventive LCB polymer enables subsequent derivatization reactions providing a broad variety of LCB compositions and structures.

In a particular embodiment, an inventive LCBPP polymer (IV') includes pendant styrene groups along the backbone which are very reactive in many chemical reactions, such as free radical, cationic, anionic and transition metal coordination reactions. These groups can serve as the reactive sites for selective crosslinking and/or functionalization reactions to produce functionalized LCBPP polymers. Furthermore, these groups can further serve as the monomers, initiators, chain transfer agents for subsequent graft reactions to produce modified LCBPP structures containing additional polymer side chains. The versatility of LCBPP polymer (IV') enables subsequent derivatization reactions providing a broad variety of LCBPP compositions and structures.

In one embodiment, crosslinking and functionalization reactions of an inventive LCB polymer, such as an LCBPP polymer (IV'), involve conventional organic olefinic chemistry, which can be run in bulk, finely dispersed slurry solution, or homogeneous polymer solution. Bulk reactions can also be effective in an extruder, or other internal mixer, suitably modified to provide adequate mixing. The details of such bulk processes are set forth, for example, in U.S. Pat. No. 4,548, 995, the disclosure of which is incorporated herein by reference. Solution processes are advantageous in that they permit good mixing and an ability to control reaction conditions more easily. Solution processes also facilitate the removal of undesired by-products. Pendant functional groups in an LCBPP polymer are very useful in improving PP adhesion, paintability, and compatibility with substrates and other materials. Exemplary useful pendant functional groups include OH, epoxy, $NH_2$, COOH, anhydride, Cl, and Br.

In a preferred embodiment, the pendant styrene moieties in LCBPP polymer (IV') serve as monomer, initiator, and chain transfer agents in a subsequent graft reaction with olefinic monomers. The graft reactions include graft-from, graft-onto, and graft-through processes. A pendant styrene moiety, resembles a styrene monomer in that they are very reactive in many chain polymerization reactions, including free radical, cationic, anionic and transition metal coordination polymerization reactions. In the presence of olefinic monomers, LCBPP polymer (IV') and catalyst, a graft polymerization reaction takes place involving the pendant styrene groups in the LCBPP polymer (IV') to form a graft copolymer (IX') containing various polymer side chains. An illustrative inventive graft copolymer has the formula:

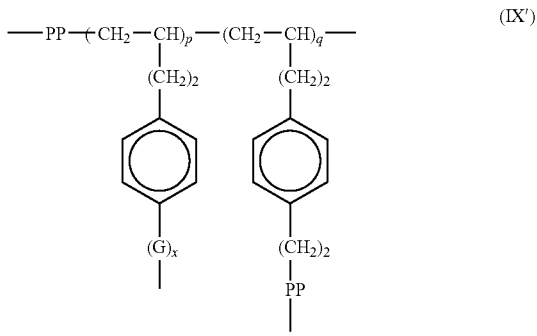

(IX')

where in q is at least 1, and preferably between 2 and 50, and most preferably between 2 and 20, and p can be zero or the number between 1 and 99. G is an incorporated vinyl monomer unit, such as an anion-polymerizable monomer or a radical polymerizable unit. The number of repeating units (x) is between 100 and 50,000. Preferably, x is between 150 and 10,000, and most preferably x is between 200 and 5,000. The average number of repeating propylene units in the main chain is between 500 and 100,000. Preferably, the number is between 800 and 10,000, and most preferably number is between 1,000 and 5,000. The average number of repeating propylene units in each side chain is between 100 and 50,000. Preferably, the number is between 150 and 10,000, and most preferably the number is between 200 and 5,000.

In an example of a free radical graft reaction process, a pendant styrene unit in an LCBPP polymer (IV') may serve as a monomer directly. After mixing LCBPP polymer (IV') with the free radical polymerizable alpha-olefin monomer, optionally in a suitable diluent, the free radical initiator is introduced to initiate graft-onto or/and graft-through polymerization reactor under conditions effective to form free radicals. Radical polymerizable monomers useful in a graft reaction include those well known in the art such as methyl methacrylate, ethyl methacrylate, butyl methacrylate, octyl methacrylate, methacrylic acid, methyl acrylate, ethyl acrylate, butyl acrylate, octyl acrylate, 2-hydroxyethyl acrylate, glycidyl acrylate, acrylic acid, maleic anhydride, vinyl acetate, acrylonitrile, acrylamide, vinyl chloride, vinyl fluoride, vinylidenedifluoride, tertrafluoroethylene, styrene, alpha-methyl styrene, trimethoxyvinylsilane, triethoxyvinylsilane and so on. These radical polymerizable monomers can be used either singly or as a combination of two or more monomers.

In the case of an anionic graft reaction, a preferred process involves the conversion of pendant styrene groups to living anionic initiators. Such a process may include a metallation reaction of LCBPP polymer (IV') with alkyllithium (such as n-BuLi) to form a polyolefin containing pendant benzylic anions, as illustrated below. By limiting the amount of alkyllithium added to the reaction to an amount less than would be required to react with all of the divinylbenzene units in the LCBPP polymer (IV'), the metallation reaction between styrene and alkyllithium will be quantitative. In other words, no purification will be needed before adding an anion-polymerizable monomer to continue the living anionic graft-from polymerization process. Preferred anion-polymerizable monomers include, for example, vinyl aromatic compounds, such as styrene and alkyl substituted styrene, acrylamides, alkyl acrylates and methacrylates, and conjugated dienes, such as isoprene and butadiene, and their mixtures. With the coexistence of polymeric anions and monomers susceptible to anionic polymerization, living anionic polymerization takes place, as is described, for example, by Milkovich et al in U.S. Pat. No. 3,786,116. It is important to note that the anionic polymerization of various monomers, such as methyl methacrylate, can take place at room temperature without causing any detectable side reactions, which may be associated with the stable benzylic anion initiator. After achieving the desired composition of the graft copolymer, the graft-from reaction can be terminated by adding a proton source, e.g., an alcohol such as methanol or isopropanol, or other conventional polymerization terminator to the reaction mass. In addition, the living anionic chain ends can be converted to a variety of functional groups by controlled termination reactions using any of a number of electrophiles, including ethylene oxide, propylene oxide, episulfides and carbon dioxide, before adding the proton source. The termination reactions are very effective at room temperature. However, an excess of terminating agent usually is used to assure complete termination of the polymerization reaction. A wide range of polymers, including random and block copolymers, with well-defined molecular weight and narrow molecular weight distribution, can be prepared by anionic polymerization. Thus, by using this easily controllable living graft-from reaction technique, a variety of graft copolymer compositions with well-defined side chain segments have been produced.

An inventive process for forming an LCB polyolefin is further exemplified by the preparation of LCB isotactic polypropylene (LCBPP) with controlled molecular structure and high melting temperature (Tm~160° C.). An embodiment of an inventive in situ LCB reaction involves polymerization of propylene with p-(3-butenyl)styrene using iso-specific rac-$Me_2Si[2-Me-4-Ph(Ind)]_2ZrCl_2$/MAO catalyst in the presence of hydrogen. Without wishing to be bound by theory, a reaction scheme is illustrated below:

Equation 2

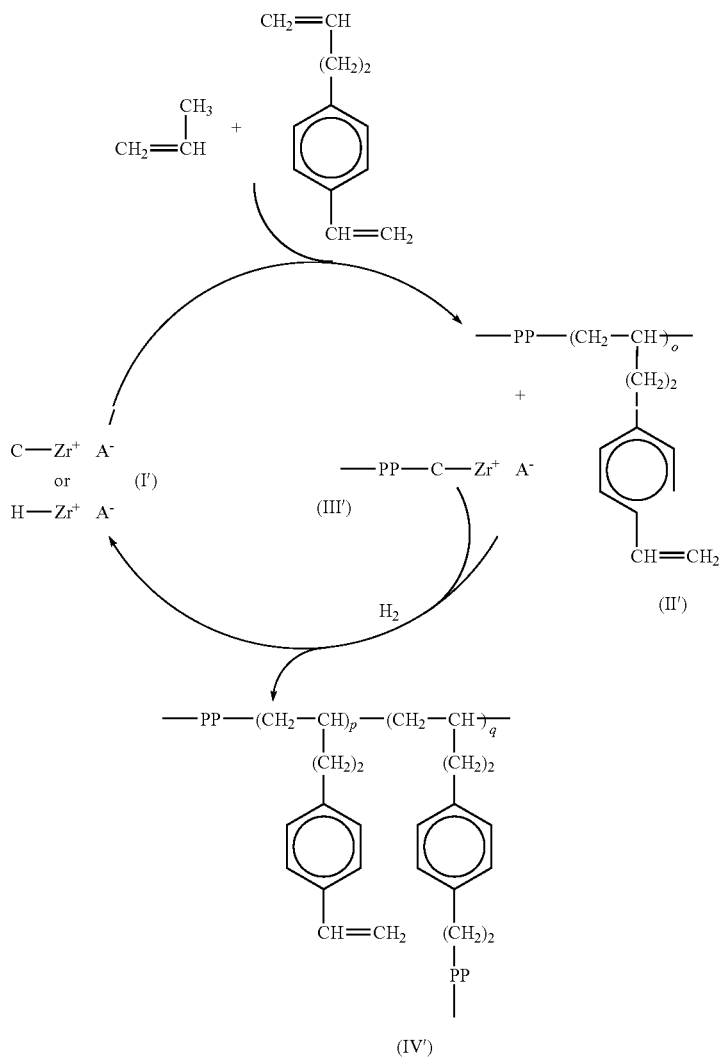

wherein o is at least 1, and preferably between 2 and 100, and most preferably between 2 and 50, and q is at least 1, and preferably between 2 and 50, and most preferably between 2 and 20, and p can be zero or the number (o-q). The average number of repeating propylene units in the main chain is between 500 and 100,000. Preferably, the number is between 800 and 10,000, and most preferably number is between 1,000 and 5,000. The average number of repeating propylene units in each side chain is between 100 and 50,000. Preferably, the number is between 150 and 10,000, and most preferably the number is between 200 and 5,000.

The propagation C—$Zr^+$ site (I') formed by rac-$Me_2Si$[2-Me-4-Ph(Ind)]$_2ZrCl_2$/MAO can polymerize or copolymerizes propylene with p-(3-butenyl)styrene (at alpha-olefin moiety) to form linear PP homopolymer (III') and copolymer containing pendant styrene units (II'), respectively. In addition, the propagating PP chain (III') is known to react with styrene unit (with 2,1-insertion) to form a dormant species due to steric hindrance between the active site (C—$Zr^+$) and incoming monomer (propylene with 1,2-insertion) and the formation of complex between the adjacent phenyl group and the $Zr^+$ ion (Chung et al. U.S. Pat. No. 6,479,600). On the other hand, with the presence of hydrogen, the dormant species react with hydrogen to form LCBPP (IV') and regenerate H—$Zr^+$ species (I') that is capable of reinitiating the polymerization of propylene and, thus, continuing polymerization cycle. In other words, the ideal chain transfer reaction will not significantly affect the rate of polymerization, but will produce LCBPP polymers. Both branch density and branch length can be conveniently controlled by p-(3-butenyl)styrene/hydrogen "T" reagent (IV), higher concentration higher branch density and lower branch length.

In accordance with another embodiment of the invention, long chain branching polyolefin (III) can be used alone or physically mixed with polyolefin that has the same main or side chain of the long chain branching polyolefin (III). A small concentration of long chain branching polymer can greatly enhance processibility and melt strength of the corresponding polymer with narrow molecular weight distribution. Furthermore, the long chain branching polyolefin (III) can be further chemically modified by taking the advantage of the existing unbranched "T" units that contain several reactive Y groups. The Y groups in long chain branching polyolefin (III) can easily engage many reactions, including crosslinking, functionalization, and graft reactions, under mild reaction conditions. Such reactions do not change main and side chains in long chain branching polyolefin (III), but greatly enhance its performance, such as adhesion, compatibility, paintability, and mechanical strength.

A number of Examples are included illustrating embodiments of inventive methods and compositions. Tables 1-4 are included in examples below and summarize a systematic study of in situ LCB propylene polymerization by using rac-Me$_2$Si[2-Me-4-Ph(Ind)]$_2$ZrCl$_2$/MAO catalyst in the presence of p-(3-butenyl)styrene/hydrogen "T" reagent. The resulting LCBPP polymers (IV') are compared with several control linear polymers, including PP homopolymer, poly(propylene-co-butenylbenzene) (VII') and butylstyrene-terminated PP (VIII'). In general, the experimental results summarized in these Tables illustrate characteristics of an illustrative inventive polymer synthesized according to the reaction scheme shown in Equation 2, in which most of p-(3-butenyl)styrene molecules are first copolymerized with propylene within short reaction time, especially in the reactions with low p-(3-butenyl)styrene concentrations. The resulting PP copolymer containing some pendant styrene units is then subsequently involved chain transfer reaction (in situ branching reaction) in the presence of hydrogen.

Introduction of hydrogen plays an important role in this particular embodiment of an LCB reaction. In one experiment, a small amount of p-(3-butenyl)styrene completely stopped the polymerization of propylene. The introduction of hydrogen restored the catalyst activity. Hydrogen is an important factor in completing the chain transfer cycle during the long chain branching reaction. Comparing all runs in Tables 1-4 by altering p-(3-butenyl)styrene concentration, it is observed that the higher the concentration of the p-(3-butenyl)styrene, the higher the hydrogen pressure required, and the higher the incorporated p-(3-butenyl)styrene units in the resulting PP polymer.

The following examples are illustrative of the invention:

EXAMPLE 1

LCB polymers are synthesized according to inventive processes, then weighed and analyzed by a combination of analytic methods, including nuclear magnetic resonance (NMR), differential scanning calorimetry (DSC) and gel permeation chromatography with three detectors (GPC-triple detectors), including reflection index, light scattering, and intrinsic viscosity, to determine the monomer conversion, polymer composition, thermal transition temperature, molecular weight, and LCB molecular structure as described in more detail below. For comparison, some control linear polymers are also prepared and examined, they are prepared under the same reaction conditions except using two modified single-function "T" reagents that contain either X or Y functionality to prepare the corresponding main chain and side chain, respectively, of LCB polyolefin.

These two control reactions, using butenylbenzene (V') and p-butylstyrene (VI') to replace p-(3-butenyl)styrene/hydrogen "T" reagent (IV), are carried out under the same reaction conditions as used for LCB polymer synthesis for comparison, as illustrated below.

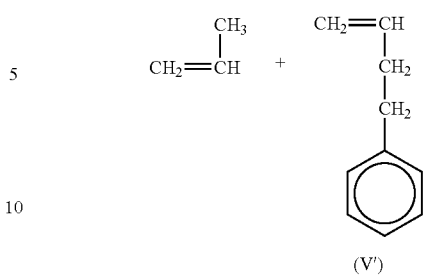

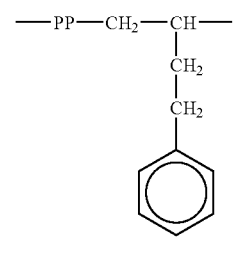

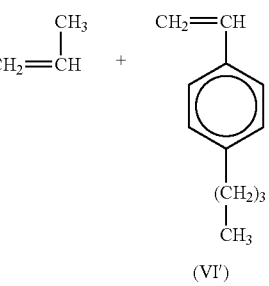

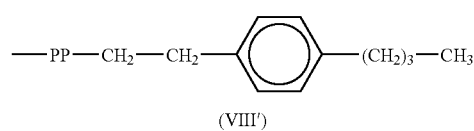

These two control reactions and their products provide important information of the effects of each moieties (alpha-olefin and styrene) in p-(3-butenyl)styrene/hydrogen "T" reagent (IV) to the rac-Me$_2$Si[2-Me-4-Ph(Ind)]$_2$ZrCl$_2$/MAO mediated propylene polymerization. The resulting two linear isotactic PP polymers, including poly(propylene-co-butenylbenzene) (VII') and butylstyrene-terminated PP (VIII'), resemble main chain and side chains, respectively, of a corresponding LCBPP polymer (IV').

EXAMPLE 2

Control Reaction 1—Copolymerization of propylene and butenylbenzene Using a rac-Me$_2$Si[2-Me4-Ph(Ind)]$_2$ZrCl$_2$/MAO Catalyst A control reaction is conducted to examine the copolymerization activity between propylene and butenylbenzene (V') using rac-Me$_2$Si[2-Me-4-Ph(Ind)]$_2$ZrCl$_2$/MAO catalyst system to form linear propylene/butenylbenzene copolymer (VII'). In a dry box, 50 ml of toluene and 1.5 ml of MAO (30 wt % in toluene) are charged into a parr 450 ml stainless autoclave equipped with a mechanical stirrer. After removal from the box, the reactor is injected with 1 ml of butenylbenzene before charging 100 psi propylene to saturate the toluene solution at ambient temperature. About $1.25 \times 10^{-6}$ mole of rac-Me$_2$Si[2-Me-4-Ph(Ind)]$_2$ZrCl$_2$ in toluene solution is then syringed into the reactor to start the copolymerization reaction. After 3 minutes, this batch slurry polymerization is terminated by adding 100 ml of dilute HCl solution in methanol. The resulting PP copolymer (VII') is further washed with methanol, and then vacuum-dried at 50° C. Catalytic activity is 87,500 kg of PP/mol of Zr.h., which is similar to 93,000 kg of PP/mol of Zr.h. of the corresponding propylene homopolymerization using the same rac-Me$_2$Si[2-Me-4-Ph(Ind)]$_2$ZrCl$_2$/MAO catalyst. $^1$H NMR spectrum indicates about 1.6 mol % of butenylbenzene units incorporated in the resulting PP copolymer. The linearity of polymer structure examined by GPC-triple detectors is discussed below in other examples.

EXAMPLE 3

Control Reaction 2—Chain Transfer Reaction in rac-Me$_2$Si[2-Me-4-Ph(Ind)]$_2$ZrCl$_2$/MAO Mediated propylene polymerization using a p-butylstyrene (VI')/H$_2$ Chain Transfer Agent In a dry box, 50 ml of toluene and 1.5 ml of MAO (30 wt % in toluene) are charged into a parr 450 ml stainless autoclave equipped with a mechanical stirrer. After removal from the box, the reactor is purged with hydrogen (20 psi) before injecting 0.5 ml of p-butylstyrene. The reactor is then charged with 100 psi propylene to saturate the toluene solution at ambient temperature and to increase the total pressure in the reactor to 120 psi. About $1.25 \times 10^{-6}$ mole of rac-Me$_2$Si[2-Me-4-Ph(Ind)]$_2$ZrCl$_2$ in toluene solution is then syringed into the reactor, under rapid stirring, to initiate the polymerization. Additional propylene is fed continuously into the reactor to maintain a constant pressure (120 psi) during the entire course of the polymerization. After a 15 minute reaction at 30° C., the polymer solution is quenched with methanol. The resulting linear butylstyrene-terminated PP (VIII') polymer is washed with tetrahydrofuran (THF), and then vacuum-dried at 50° C. About 23 g of butylstyrene-terminated PP (VIII') polymer is obtained with significantly reduced polymer molecular weight (Mw=20,500 and Mn=9,300 g/mole), discussed in other examples.

The in situ chain transfer to p-butylstyrene/hydrogen during the metallocene-catalyzed polymerization of propylene is also evidenced by the comparative experiment that is carried out under the same reaction conditions except without hydrogen. No polymer is formed in this reaction even after a long reaction time, and a small amount of hydrogen dramatically increases catalyst activity, see also U.S. Pat. No. 6,479,600.

EXAMPLE 4

Figure 2:
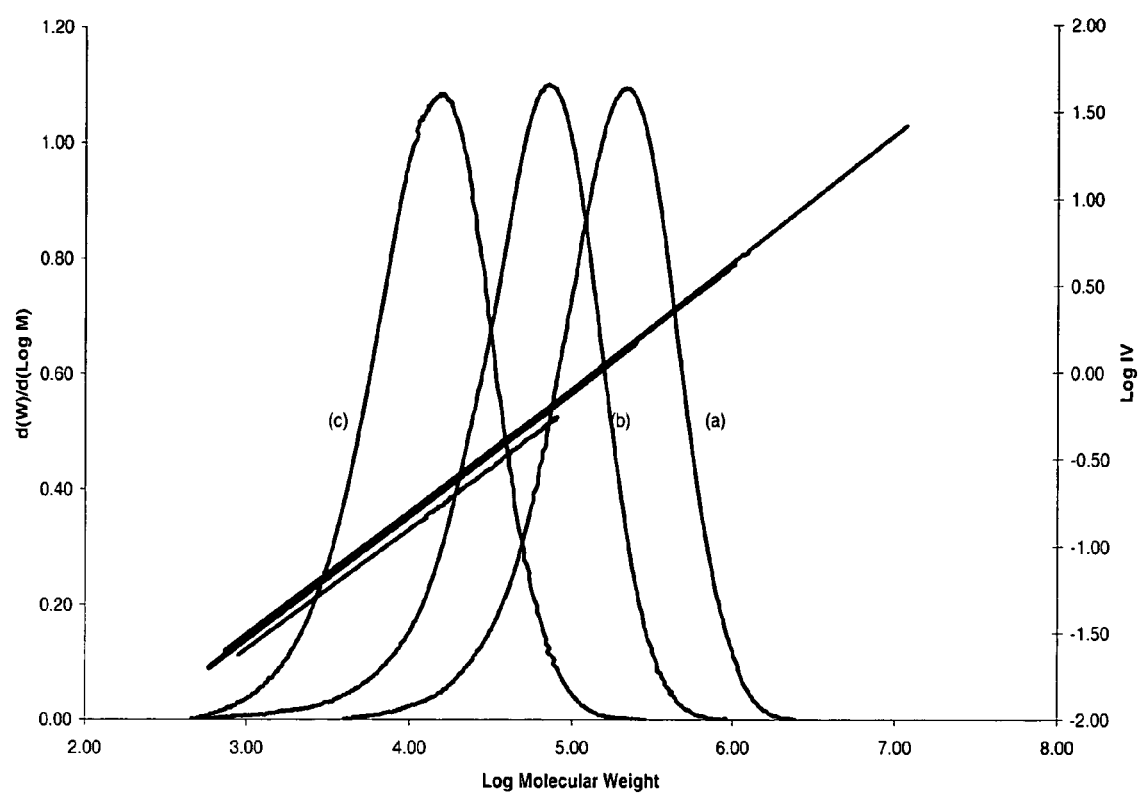
FIG. 2 shows superimposed molecular weight distributions and Mark-Houwink plots for three control linear polymers, including (a) PP homopolymer, (b) poly(propylene-co-butenylbenzene), and (c) butylstyrene-terminated PP, prepared by rac-Me$_2$Si[2-Me-4-Ph(Ind)]$_2$ZrCl$_2$/MAO, and a Mark-Houwink plot for a standard linear PP polymer.

FIG. 2 shows molecular weight distributions and Mark-Houwink plots of three control polymers, including PP homopolymer and two control polymers (VII') and (VIII') (Examples 2 and 3), resembling main chain and side chains in LCBPP polymer (IV'), respectively. They are prepared by the same rac-Me$_2$Si[2-Me-4-Ph(Ind)]$_2$ZrCl$_2$/MAO catalyst. The Mark-Houwink plots of controls are also compared with that of an industrial standard linear PP polymer. All plots show an overlap with the same slope and the same linear relationship from low to high molecular weight. As expected, the controls and standard are all linear polymers and the molecular weight of main chain (VII') is several times higher than that of side chain (VIII'), due to chain transfer reaction.

EXAMPLE 5

Synthesis of LCBPP Using a rac-Me$_2$Si[2-Me-4-Ph(Ind)]$_2$ZrCl$_2$/MAO Catalyst and a p-(3-Butenyl)styrene/Hydrogen "T" Reagent In a dry box, 50 ml of toluene and 1.5 ml of MAO (30 wt % in toluene) are charged into a parr 450 ml stainless autoclave equipped with a mechanical stirrer. After removal from the box, the reactor is purged with hydrogen (6 psi) before injecting 0.1 ml (0.012 M) of p-(3-butenyl)styrene. The reactor is then charged with 100 psi propylene to saturate the toluene solution at ambient temperature and to increase the total pressure in the reactor to 120 psi. About $1.25 \times 10^{-6}$ mole of rac-Me$_2$Si[2-Me-4-Ph(Ind)]$_2$ZrCl$_2$ in toluene solution is then syringed into the reactor, under rapid stirring, to initiate the polymerization. Additional propylene is fed continuously into the reactor to maintain a constant pressure (120 psi) during the entire course of the polymerization. To minimize mass-transfer and to maintain the constant feed ratio, the polymerization is carried out with rapid mixing and a short reaction time. After a 3 minutes reaction time at 30° C., the polymer solution is quenched with methanol. The resulting LCBPP is washed with tetrahydrofuran (THF), and then vacuum-dried at 50° C. Catalytic activity is 96,250 kg of PP/mol of Zr.h. The LCBPP polymer is analyzed by $^1$H NMR, by $^{13}$C NMR, by Differential Scanning Calorimetry (DSC), and by Gel Permeation Chromatography with a series of detectors, including reflection index, light scattering, and intrinsic viscosity (GPC-triple detectors). Measurements are made at 140° C. using 1,2,4-trichlorobenzene (TCB) as solvent and mobile phase with a flow rate of 0.7 mi/min. The $^1$H and $^{13}$C NMR studies are recorded on a Bruker AM-300 spectrometer with DISNMR software. The measurements are made at 110° C. using C$_2$D$_2$Cl$_4$ as the solvent containing 1% TMS (Me$_4$Si ($\delta$=0.00 ppm)) as an external standard. Differential Scanning Calorimetry (DSC) is measured on a Perkin Elmer DSC-7 instrument controller. The DSC curves are recorded in the second heating cycle with a heating rate of 20° C./min.

An inventive LCB polymerization involving chain transfer reaction to pendant styrene units during the metallocene-catalyzed polymerization of propylene is evidenced by comparison with two control reactions that are carried out under similar reaction conditions, using the same catalyst and propylene concentration, but without p-(3-butenyl)styrene/hydrogen "T" reagent and with p-(3-butenyl)styrene but no hydrogen. The experimental results are compared in Table 1.

TABLE 1

Comparison of the experimental results in the rac-Me$_2$Si[2-Me-4-Ph(Ind)]$_2$ZrCl$_2$/MAO catalyzed polymerization$^a$ of propylene.

| Sample | BtSt$^b$ (M) | H$_2$ (psi) | Time (min) | Cat. Activity$^b$ | BtSt in PP (mole %) | BtSt Conversion (%) | Tm (° C.) |
|---|---|---|---|---|---|---|---|
| 1 | 0.012 | 6 | 3 | 96,250 | 0.67 | ~100 | 158.3 |
| Control 1-A | 0.012 | 0 | 30 | 24 | 0.61 | 0.78 | 158.2 |
| Control 1-B | 0 | 0 | 3 | 93,000 | — | — | 159.6 |

$^a$reaction conditions: 50 ml toluene, propylene (100 psi), [Zr] = 1.25 × 10$^{-6}$ mol/l, [MAO]/[Zr] = 3000, temperature = 30° C.
$^b$BtSt: p-(3-butenyl)styrene; catalyst activity = kg of PP/mol of catalyst · h.

In control 1-A reaction with only p-(3-butenyl)styrene alone, the polymerization is almost completely stopped. The introduction of hydrogen (sample 1) restores the catalyst activity, similar to that of homopolymerization of propylene (Control 1-B). Hydrogen is clearly needed to complete the chain transfer cycle during the rac-Me$_2$Si[2-Me-4-Ph(Ind)]$_2$ZrCl$_2$-mediated propylene polymerization.

EXAMPLE 6

Synthesis of LCBPP Using a rac-Me$_2$Si[2-Me-4-Ph(Ind)]$_2$ZrCl$_2$/MAO catalyst and a p-(3-Butenyl)styrene/Hydrogen "T" Reagent—Effect of T Reagent Concentration Following similar procedures, described in Example 5, an experiment is conducted to evaluate the effect of p-(3-butenyl)styrene concentration. The experiment is carried out using the same rac-Me$_2$Si[2-Me-4-Ph(Ind)]$_2$ZrCl$_2$ (1.25×10$^{-6}$ mol/l) catalyst in toluene solution with [MAO]/[Zr]=3000, propylene (100 psi), and hydrogen (6 psi), except doubling the concentration of p-(3-butenyl)styrene. The resulting LCBPP is subjected to the same structure analysis using $^1$H and $^{13}$C NMR, DSC, and GPC-triple detectors. A control reaction 2-A, without hydrogen, is also carried out to compare the experimental results, a as shown in Table 2. Without hydrogen, there is no polymer formed even after 30 minutes. On the other hand, the catalyst activity is almost the same as that of propylene homopolymerization with a small amount of hydrogen, and almost all of the p-(3-butenyl)styrene molecules are incorporated into LCBPP structure with 0.89 mol % of p-(3-butenyl)styrene units.

EXAMPLES 7-10

Synthesis of LCBPP Using a rac-Me$_2$Si[2-Me-4-Ph(Ind)]$_2$ZrCl$_2$/MAO catalyst and a p-(3-Butenyl)styrene/Hydrogen "T" Reagent—Effect of T Reagent and Hydrogen Concentrations In a series of examples, a systematic study is conducted to evaluate the effect of p-(3-butenyl)styrene and hydrogen concentrations on the catalyst activity and p-(3-butenyl)styrene incorporation. Each experiment is carried out using the reaction procedures and condition described in Example 5, i.e. rac-Me$_2$Si[2-Me-4-Ph(Ind)]$_2$ZrCl$_2$ (1.25×10$^{-6}$ mol/l) catalyst in toluene solution with [MAO]/[Zr]=3000 and propylene (100 psi). Hydrogen pressure is adjusted according to the concentration of p-(3-butenyl)styrene that is varied in each example, as indicated in Table 3. All four comparative reaction sets show the essential role of hydrogen to complete the chain transfer reaction that produces an inventive LCB polymer under specified conditions. As the p-(3-butenyl)styrene concentration increases, an increased amount of hydrogen is needed to maintain high catalyst activity and p-(3-butenyl)styrene conversion.

TABLE 2

Comparison of the experimental results in the rac-Me$_2$Si[2-Me-4-Ph(Ind)]$_2$ZrCl$_2$/MAO catalyzed polymerization$^a$ of propylene.

| Sample | BtSt$^b$ (M) | H$_2$ (psi) | Time (min) | Cat. Activity$^b$ | BtSt in PP (mole %) | BtSt Conversion (%) | Tm (° C.) |
|---|---|---|---|---|---|---|---|
| 2 | 0.024 | 6 | 3 | 97,380 | 0.89 | ~100 | 156.4 |
| Control 2-A | 0.024 | 0 | 30 | 0 | — | — | — |

$^a$reaction conditions: 50 ml toluene, propylene (100 psi), [Zr] = 1.25 × 10$^{-6}$ mol/l, [MAO]/[Zr] = 3000, temperature = 30° C.
$^b$BtSt: p-(3-butenyl)styrene; catalyst activity = kg of PP/mol of catalyst · h.

TABLE 3

A summary of LCBPP polymers prepared by rac-Me$_2$Si[2-Me-4-Ph(Ind)]$_2$ZrCl$_2$/MAO catalyst[a] in the presence of propylene and p-(3-butenyl)styrene/hydrogen "T" reagent.

| Sample | BtSt[b] (M) | H$_2$ (psi) | Time (min) | Cat. Activity[b] | BtSt in PP (mole %) | BtSt Conversion (%) | Tm (° C.) |
|---|---|---|---|---|---|---|---|
| 3 | 0.06 | 20 | 3 | 99,208 | 1.06 | 98 | 156.1 |
| 3-I | 0.06 | 6 | 3 | 45,075 | 1.18 | 68 | 156.2 |
| 4 | 0.12 | 35 | 30 | 43,317 | 1.17 | 64 | 153.8 |
| 4-I | 0.12 | 20 | 30 | 22,320 | 1.23 | 67 | 154.1 |
| 4-II | 0.12 | 6 | 30 | 10,017 | 1.52 | 48 | 153.3 |
| 5 | 0.24 | 35 | 30 | 17,743 | 1.86 | 31 | 151.6 |
| 5-I | 0.24 | 20 | 30 | 13,500 | 2.07 | 30 | 152.1 |
| 5-II | 0.24 | 6 | 30 | 6,798 | 2.43 | 17 | 151.5 |
| 6 | 0.36 | 35 | 30 | 7,789 | 2.51 | 6 | 145.9 |
| 6-I | 0.36 | 20 | 30 | 5,763 | 2.89 | 8 | 147.6 |

[a]reaction conditions: [Zr] = 1.25 × 10$^{-6}$ mol/l, [MAO]/[Zr] = 3000, 50 ml toluene, propylene (100 psi), temperature = 30° C.
[b]BtSt: p-(3-butenyl)styrene; catalyst activity = kg of PP/mol of catalyst · h.

EXAMPLES 11-13

Synthesis of LCBPP Using a rac-Me$_2$Si[2-Me-4-Ph(Ind)]$_2$ZrCl$_2$/MAO catalyst and a p-(3-Butenyl)styrene/Hydrogen "T" Reagent—Effect of Catalyst Following similar procedures, described in Example 5, a series of examples are conducted to evaluate the effect of catalyst on LCB structure. The experiment is carried out using rac-Me$_2$Si[2-Me-Ind]$_2$ZrCl$_2$ (1.25×10$^{-6}$ mol/l) catalyst in toluene solution with [MAO]/[Zr]=3000, propylene (100 psi), and varying the concentration of p-(3-butenyl)styrene. Hydrogen pressure is adjusted to achieve highest catalyst activity. Three samples (7, 8 and 9) are obtained by using 1, 3, and 5 ml of p-(3-butenyl)styrene, respectively, and their structures are subjected to the same analysis using $^1$H and $^{13}$C NMR, DSC, and GPC-triple detectors. A control reaction 2-A, without hydrogen, is also carried out to compare with experimental results, as shown in Table 2. Without hydrogen, there is no polymer formed even after 30 minutes. On the other hand, the catalyst activity is almost the same as that of propylene homopolymerization with a small amount of hydrogen, and almost all of p-(3-butenyl)styrene molecules are incorporated into LCBPP structure with 0.89 mol % of p-(3-butenyl)styrene units.

EXAMPLE 14

Analysis of LCB Structure by NMR Technique

All polymer samples are analyzed by $^1$H NMR technique to determine the content of "T" reagent and its incorporation modes in the resulting LCBPP polymer (IV'). A typical $^1$H NMR spectrum of Sample 3 is shown in FIG. 1. Polymers are analyzed by $^1$H NMR technique to determine the content of "T" reagent in the resulting LCBPP polymer (IV') and its incorporation modes. FIG. 1 shows a typical $^1$H NMR spectrum of a LCBPP polymer (Sample 3), prepared by rac-Me$_2$Si [2-Me-4-Ph(Ind)]$_2$ZrCl$_2$/MAO catalyst, and peak assignments for the incorporated p-(3-butenyl)styrene "T" units. By comparing LCBPP (IV') with two control polymers (VII') and (VIII'), all the chemical shifts associated with the corresponding protons can be quantitatively determined. They are from three possible structures 1, 2, and 3, resulting from copolymerization, chain transfer, and both reactions, respectively. In addition to three major proton chemical shifts ($\delta$=0.95, 1.35, and 1.65 ppm) corresponding to CH$_3$, CH$_2$, and CH groups in the PP main and side chains, there are several minor chemical shifts between 2 and 8 ppm, which correspond to the incorporated "T" units in LCBPP polymers (IV'). Detailed experimental results for LCBPP polymers (Samples 1-6) are summarized in Table 4.

TABLE 4

Structures of p(3-butenyl)styrene "T" units in the LCBPP Polymers.

| Sample | BtSt in PP (mole %) | BtSt incorporation mode (%) | | | Tm (° C.) |
|---|---|---|---|---|---|
| | | Structure 1 | Structure 2 | Structure 3 | |
| 1 | 0.67 | 42.3 | n.d. | 57.7 | 158.3 |
| 2 | 0.89 | 46.5 | n.d. | 53.5 | 156.4 |
| 3 | 1.06 | 46.8 | n.d. | 53.2 | 156.1 |
| 4 | 1.17 | 46.8 | 1.9 | 51.3 | 153.8 |
| 5 | 1.86 | 47.2 | 3.6 | 49.2 | 151.6 |
| 6 | 2.51 | 46.9 | 4.8 | 48.3 | 145.9 |

*BtSt: p-(3-butenyl)styrene;
n.d.: not detectable

An extremely low concentration of structure 2 in each product is observed, indicating a low percentage of direct chain transfer reaction to "T" reagent. Most of "T" reagents firstly involve copolymerization with propylene to form PP main chain that contains several "T" units (II'), and then more than half of the incorporated "T" units also engage in chain transfer reaction with some propagating PP chains (III') to form LCBPP product (IV'). Based on the content of the incorporated "T" units and their percentage conversion to LCB structures (Structure 3), we can estimate the average branch density in each LCBPP sample, which is between 2 and 6 per 1000° C. in main and side chains and is proportional to the concentration of "T" reagent used during the polymerization. Melting temperature (Tm) of LCBPP samples also indicates the branching structure—Tm decreases with the increase of branch density.

EXAMPLE 15

Analysis of LCB Structure by GPC-Triple Detectors

Figure 3:
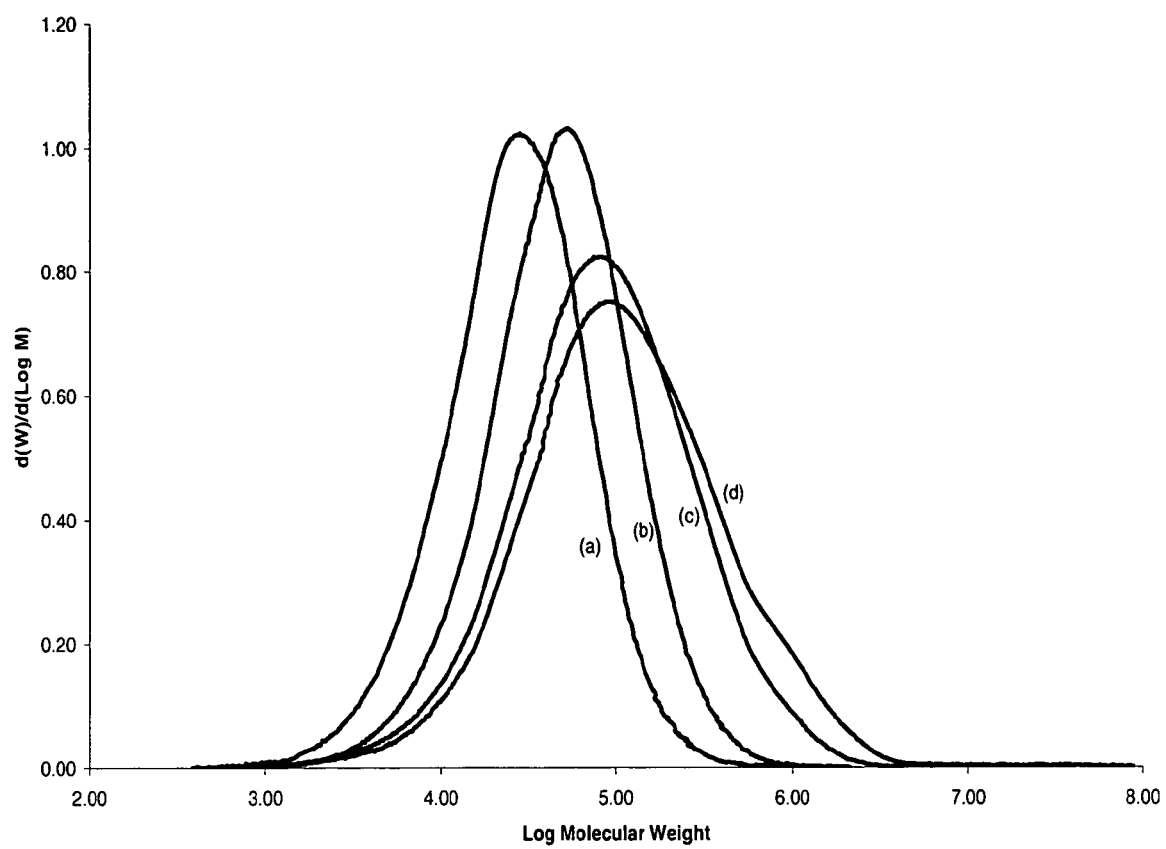
FIG. 3 shows a superimposed molecular weight distributions of four LCBPP polymers, including (a) Sample 1, (b) sample 2, (c) sample 3, and (d) samples 6.
Figure 4:
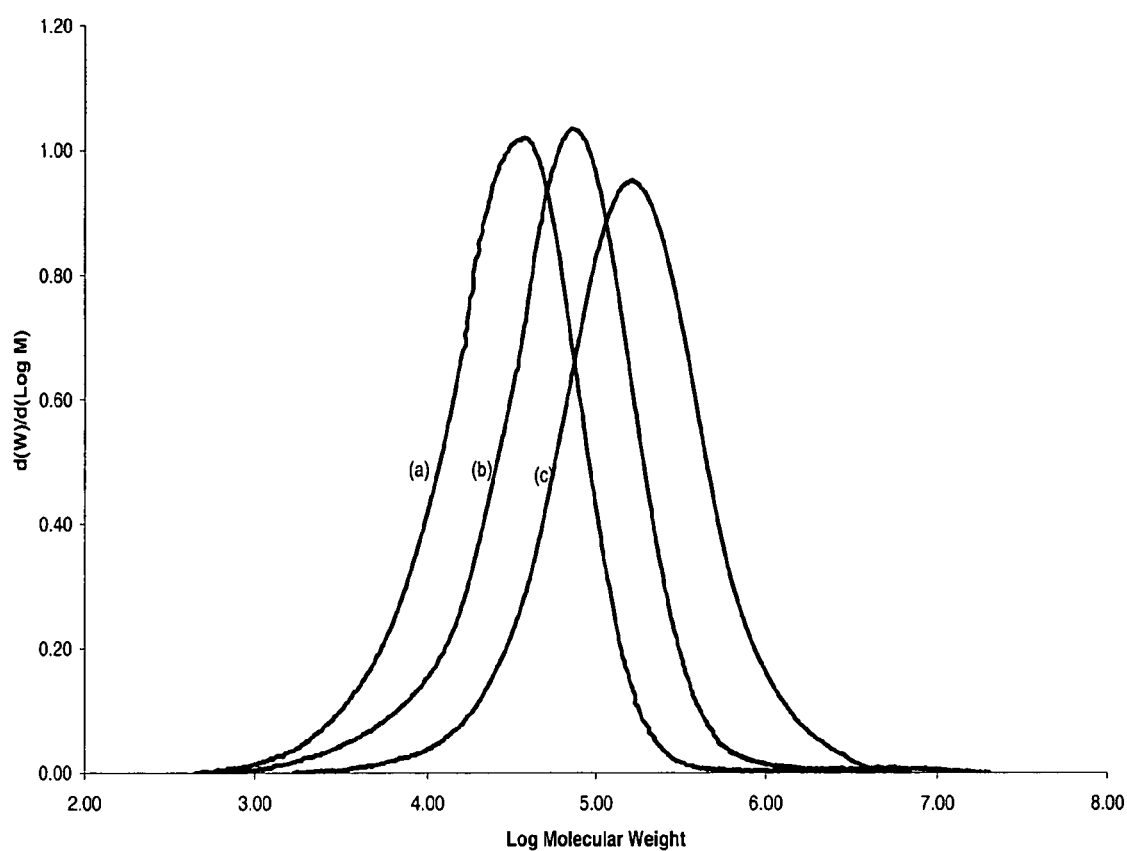
FIG. 4 shows a superimposed molecular weight distributions of three LCBPP polymers, including (a) Sample 7, (b) sample 8, and (c) sample 9.

All resulting polymers, including LCBPP polymers and linear PP polymers obtained from control reactions, are subjected to gel permeation chromatography with three detectors (reflection index, light scattering, and intrinsic viscosity) (GPC-triple detectors) to determine LCB molecular structure. This methodology provides a precise polymer molecular weight and molecular weight distribution, as well as Mark-Houwink plot, that is, a log-log plot of intrinsic viscosity vs. molecular weight. The linear polymer is expected to have a linear relationship, and the deviation from linear line (with reduced intrinsic viscosity) is a clear indication of LCB structure. FIGS. 3 and 4 show two sets of molecular weight distributions for nine comparative LCBPP samples (Samples 1, 2, 3, 6 and 7-9) prepared by rac-Me$_2$Si[2-Me-4-Ph(Ind)]$_2$ZrCl$_2$/ MAO and rac-Me$_2$Si[2-Me-Ind]$_2$ZrCl$_2$, respectively, in the presence of various p-(3-butenyl)styrene concentrations. The polymer's molecular weight increased with the increase of p-(3-butenyl)styrene concentration, which clearly indicates the increase of branch density. The overall results are consistent with the NMR results that show the exact branch densities. It is interesting to note that the polymer's molecular weight distribution stayed relatively narrow (Mw/Mn=~2), indicating a single site copolymerization with a clean chain transfer reaction.

Figure 5:
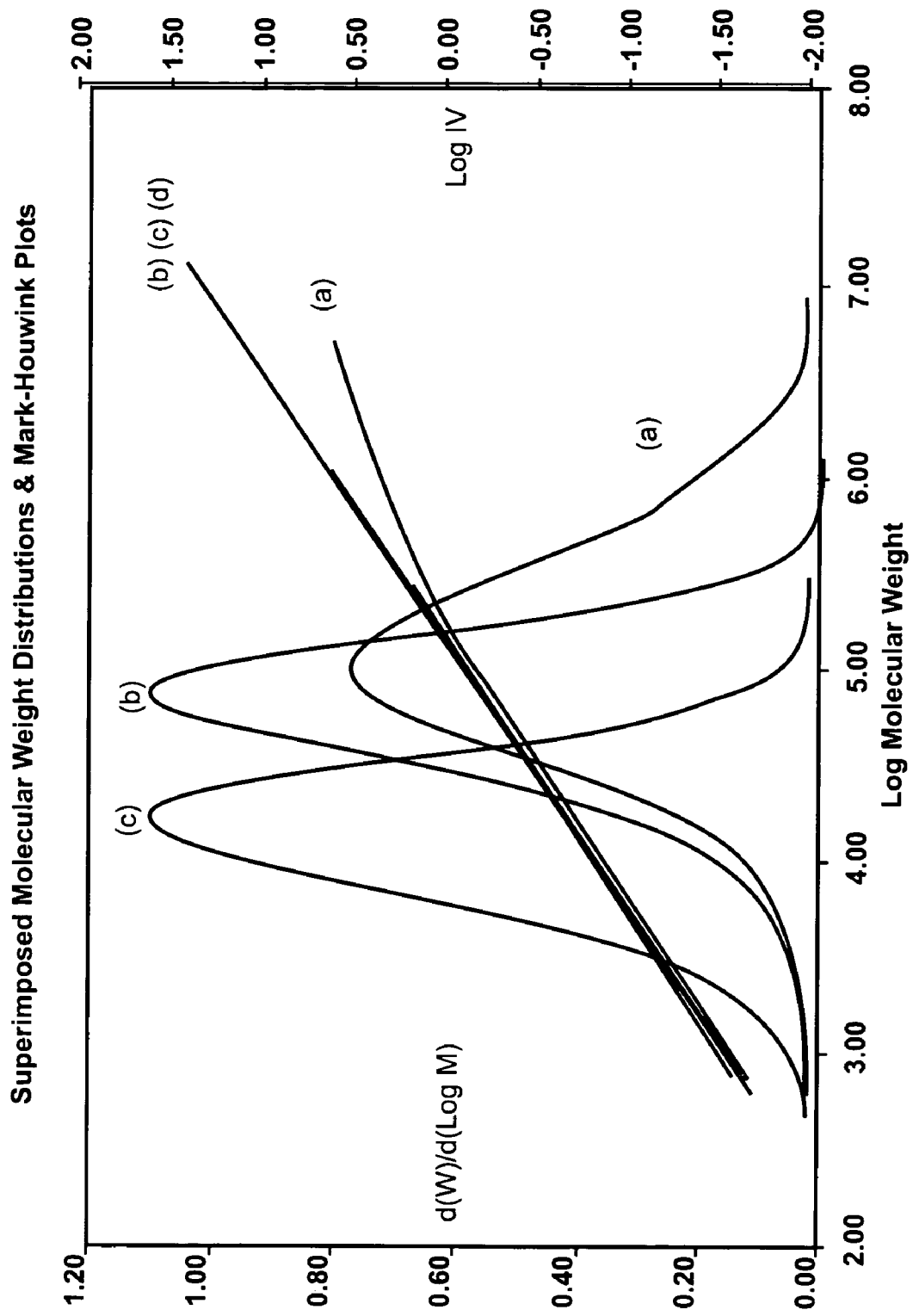
FIG. 5 shows a comparison of GPC curves and Mark-Houwink plots between (a) a LCBPP polymer (Sample 5) and three linear PP polymers from (b) Example 2, (c) Example 3, and (d) a commercial PP standard.

FIG. 5 compares Mark-Houwink plots of an LCBPP polymer (Sample 5) and three control linear polymers. In the LCBPP case, a clear deviation from linear relationship, especially high molecular weight region, clearly confirms the LCB structure.

EXAMPLES 16-20

Synthesis of LCBPP Using a rac-Me$_2$Si[2-Me-4-Ph(Ind)]$_2$ZrCl$_2$/MAO catalyst and a p-(3-Butenyl)styrene/Hydrogen "T" Reagent—Effect of Reaction Temperature A series of LCBPP samples are prepared under higher reaction temperature. In a typical example (sample 10 in Table 5), 50 ml of toluene and 2.2 ml of MAO (10 wt % in toluene) are charged into a Parr 450 ml stainless autoclave equipped with a mechanical stirrer in an argon-filled dry box. After removal from the box, the reactor is purged with hydrogen (1 psi) before injecting 0.1 ml (0.012 M) of p-(3-butenyl) styrene (BtSt). The reactor is then charged with 100 psi propylene to saturate the toluene solution at ambient temperature and to increase the total pressure in the reactor to 101 psi. Rac-Me$_2$Si[2-Me-4-Ph(Ind)]$_2$ZrCl$_2$ in toluene (2.2×10$^{-6}$ M) is then injected into the reactor, under rapid stirring, to initiate the polymerization. Additional propylene is fed continuously into the reactor to maintain a constant pressure (101 psi) during the entire course of the polymerization. To minimize mass-transfer and to maintain the constant feed ratio, the polymerization is carried out with rapid mixing and a short reaction time. After 15 minutes at 55° C., the polymer solution is quenched with methanol. The resulting LCBPP polymer is washed with tetrahydrofuran (THF), and then vacuum-dried at 50° C. Catalytic activity is 350,000 kg of PP/mol of Zr.h. The LCBPP polymer is analyzed by $^1$H NMR, $^{13}$C NMR, DSC, and GPC-triple detectors. Table 5 summarizes the preparation of five LCBPP samples under various reaction conditions.

TABLE 5

Comparison of the experimental results in the rac-Me$_2$Si[2-Me-4-Ph(Ind)]$_2$ZrCl$_2$/MAO catalyzed polymerization[a] of propylene at 55° C.

| Sample | H$_2$ (psi) | Cat. Activity[b] Kg/mol · h | BtSt in PP mol % | Tm ° C. | BtSt Incorporation Modes | | |
|---|---|---|---|---|---|---|---|
| | | | | | Stru 1 | Stru 2 | Stru 3 |
| 10 | 1 | 350,000 | 0.16 | 152 | 55.0 | n.d.[c] | 45.0 |
| 11 | 3 | 320,000 | 0.14 | 152 | 55.0 | n.d. | 45.0 |
| 12 | 5 | 330,000 | 0.16 | 152 | 51.3 | n.d. | 48.7 |
| 13 | 10 | 260,000 | 0.14 | 152 | 58.6 | n.d. | 41.4 |
| 14 | 15 | 260,000 | 0.18 | 152 | 56.7 | n.d. | 43.3 |

[a]reaction conditions: 50 ml toluene, propylene (100 psi), [BuSt] = 0.012 mol/L, [Zr] = 2.2 × 10$^{-6}$ mol/L and [Al]/[Zr] = 25000; reaction temperature: 55° C. and reaction time: 15 minutes.
[b]catalyst activity = kg of PP/mol of catalyst · h.
[c]n.d.: non-detectable.

EXAMPLES 21-28

Synthesis of LCBPP Using a C$_1$-Symmetric Me$_2$Si (2-Me-Benz[e]Ind(2-Me-4-Ph-4HAzu)HfCl$_2$/MAO Catalyst and a p-(3-Butenyl)styrene/Hydrogen "T" Reagent A series of LCBPP samples with high melting temperatures are prepared by using C$_1$-symmetric Me$_2$Si(2-Me-Benz [e]Ind(2-Me-4-Ph-4HAzu)HfCl$_2$/MAO catalyst. In a typical example (sample 20 in Table 6), 50 ml of toluene and 1.5 ml of MAO (10 wt % in toluene) are charged into a Parr 450 ml stainless autoclave equipped with a mechanical stirrer in an argon-filled dry box. After removal from the box, the reactor is injected with 0.1 ml (0.013 M) of p-(3-butenyl)styrene (BtSt). The reactor is then charged with 100 psi propylene to saturate the toluene solution at ambient temperature. Me$_2$Si (2-Me-Benz[e]Ind(2-Me-4-Ph-4HAzu)HfCl$_2$ in toluene (2×10$^{-5}$ M) is then injected into the reactor, under rapid stirring, to initiate the polymerization. Additional propylene is fed continuously into the reactor to maintain a constant pressure (100 psi) during the entire course of the polymerization. After 15 minutes at 55° C., the polymer solution is quenched with methanol. The resulting LCBPP polymer is washed with tetrahydrofuran (THF), and then vacuum-dried at 50° C. Catalytic activity is 18,000 kg of PP/mol of Hf.h. The LCBPP polymer is analyzed by $^1$H NMR, $^{13}$C NMR, DSC, and GPC-triple detectors. Table 6 summarizes the preparation of five LCBPP samples under various reaction conditions.

TABLE 6

Synthesis of LCBPP polymers Using C$_1$-symmetric Me$_2$Si(2-Me-Benz[e]Ind(2-Me-4-Ph-4HAzu)HfCl$_2$/MAO catalyst.

| Sample | Reaction conditions[a] | | | Cat. Activity[b] Kg/mol/hr | BtSt in PP Mol % | Tm ° C. | Free Styrene mol % | Branch Point mol % |
|---|---|---|---|---|---|---|---|---|
| | [BtSt] M | H$_2$ psi | time min. | | | | | |
| 15 | 0 | 0 | 15 | 19,700 | 0 | 150 | 0 | 0 |
| 16 | 0.006 | 10 | 15 | 8,600 | 0.10 | 148 | 0.07 | 0.03 |
| 17 | 0.013 | 10 | 15 | 8,400 | 0.18 | 147 | 0.13 | 0.05 |
| 18 | 0.019 | 10 | 15 | 5,000 | 0.34 | 145 | 0.24 | 0.10 |

TABLE 6-continued

Synthesis of LCBPP polymers Using $C_1$-symmetric Me$_2$Si(2-Me-Benz[e]Ind(2-Me-4-Ph-4HAzu)HfCl$_2$/MAO catalyst.

| Sample | Reaction conditions[a] | | | Cat. Activity[b] Kg/mol/hr | BtSt in PP Mol % | Tm °C. | Free Styrene mol % | Branch Point mol % |
| | [BtSt] M | H$_2$ psi | time min. | | | | | |
|---|---|---|---|---|---|---|---|---|
| 19 | 0.025 | 10 | 15 | 5,000 | 0.38 | 145 | 0.26 | 0.12 |
| 20 | 0.013 | 0 | 15 | 18,000 | 0.17 | 148 | 0.11 | 0.06 |
| 21 | 0.013 | 1 | 30 | 17,000 | 0.17 | 148 | 0.11 | 0.06 |
| 22 | 0.013 | 5 | 15 | 8,800 | 0.18 | 147 | 0.13 | 0.05 |

[a]reaction conditions: 50 ml toluene, propylene (100 psi), [Hf] = 2 × 10$^{-5}$ mol/L and [Al]/[Hf] = 4000; reaction temperature: 55° C.
[b]catalyst activity = kg of PP/mol of catalyst · h.

EXAMPLE 29

Lithiation and Silylation Reactions of LCBPP Polymer

In an argon filled dry box, 0.9 g of LCBPP polymer (Sample 3) containing 0.52 mole % of pendant styrene units is suspended in 100 ml of anhydrous cyclohexane in a 250 ml air-free flask equipped with a magnetic stirrer bar. Next, 0.5 mmol of s-butyl lithium (s-BuLi) solution and 0.5 mmol of tetramethylethylenediamine (TMEDA) are added into the flask, and the resulting solution is stirred at ambient temperature for 3 hours before adding 5 ml of trimethylsilane chloride (Me$_3$SiCl). After reacting for 1 hour at room temperature, the silylated polymer is isolated by precipitation in methanol. Repeated washing with methanol is performed before drying the resulting polymer under vacuum. $^1$H NMR spectrum shows no peak corresponding to a vinyl group and a strong peak at 0.05 ppm, corresponding to the methyl proton next to Si. Both metallation and silylation efficiencies are almost 100%.

EXAMPLE 30

Maleation Reaction of LCBPP Polymer

In a 250 ml flask equipped with a stirrer and a condenser, 0.9 g of LCBPP polymer (Sample 3) containing 0.52 mole % of pendant styrene units is suspended in 140 ml of xylene, along with 5 g of maleic anhydride and 0.1 g of free radical inhibitor. Under a nitrogen atmosphere, the solution is heated to 140° C. for 5 hours. A maleated polymer is isolated by precipitation in isopropanol. Repeated washing with isopropanol and acetone are performed before drying the resulting polymer under vacuum. IR spectrum analysis indicated a strong anhydride (C=O) absorption band with an intensity indicating about 1 wt % maleic anhydride in the polymer.

EXAMPLE 31

Anionic Graft Reactions of LCBPP Polymer with Styrene

In an argon-filled dry box, 8 g of LCBPP polymer (Sample 3) containing 0.52 mole % of pendant styrene units is suspended in 100 ml of anhydrous cyclohexane in a 250 ml air-free flask equipped with a magnetic stirrer bar. About 1 ml of 1.3 M s-BuLi and 0.5 ml TMEDA are added to the reactor. After allowing the lithiation reaction to take place at 70° C. for 4 hours, the resulting yellow polymer powder is filtered and washed repeatedly with hexane. About 1 g of the lithiated polymer is then suspended in 30 ml of cyclohexane, and 2.5 g of styrene is added into the slurry. The solution is then stirred at ambient temperature for 1 hours before adding 10 ml of isopropanol to terminate the reaction. The precipitated polymers are filtered and then subjected to fractionation. The graft copolymer structures and compositions are determined by IR, $^1$H NMR, GPC and DSC studies. Overall, the graft-from reactions are very effective, with more than 80% styrene monomer conversion within one hour. Since the graft-from reaction involves a living anionic polymerization, it is reasonable to assume that each benzylic lithium produces one polymer side chain and each side chain has a similar molecular weight. The graft density shall be the same as the density of benzylic anions. The side chain length is basically proportional to the reaction time and monomer concentration.

EXAMPLE 32

Anionic Graft Reaction of LCBPP Polymer with MMA

Following similar procedures described in Example 16, 8 g of LCBPP polymer (Sample 3) containing 0.52 mole % of pendant styrene units is metallated by s-BuLi/TMEDA reagent. About 1 g of the lithiated polymer is then suspended in 30 ml of cyclohexane, and 4 g of methymethacrylate (MMA) monomer is added into the slurry. The solution is then stirred at ambient temperature for 5 hours before adding 10 ml of isopropanol to terminate the reaction. The precipitated polymers are filtered and then subjected to fractionation. The graft copolymer structures and compositions are determined by IR, $^1$H NMR, GPC and DSC studies. Overall, the graft-from reactions are very effective, with more than 60% MMA monomer conversion.

EXAMPLE 33

Free Radical Graft Reaction of LCBPP Polymer

In a 250 ml flask equipped with a stirrer and $N_2$ atmosphere, 3 g of LCBPP polymer (Sample 3) containing 0.52 mole % of pendant styrene units is dissolved in 200 g biphenyl solvent at 130° C. After adding 4.5 g of styrene monomer, 0.3 g of dicumyl peroxide (DCP) free radical initiator is introduced into the reactor to initiate the free radical graft-onto reaction. The reaction is continued at 130° C. for 5 hours before being terminated by adding 50 ml of isopropanol. The precipitated polymer is filtered and washed repeatedly with isopropanol, then dried in vacuum oven to obtain 6.5 g polymer. The resulting polymer is fractionated by THF into 2.5 g THF-soluble ungrafted polystyrene and 3.7 g PP-g-PS graft copolymer containing 30 wt % of polystyrene.

Any patents or publications mentioned in this specification are incorporated herein by reference to the same extent as if each individual publication is specifically and individually indicated to be incorporated by reference. In particular, U.S. Provisional Patent Application 60/584,838 filed Jul. 1, 2004, is hereby incorporated by reference in its entirety.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

What is claimed is:

1. A process for forming a long chain branching polymer having the formula:

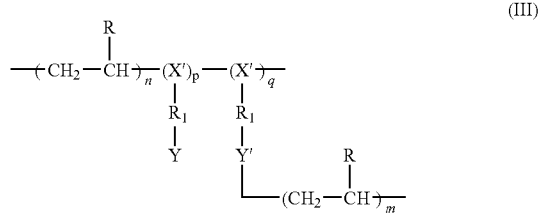

(III)

where each R is independently H or a $C_1$-$C_{30}$ substituted or unsubstituted, linear, branched, or cyclic alkyl or aryl moiety, n is an integer between 500 and 100,000, inclusive, m is an integer between 100 and 50,000, inclusive, X' is a residue of a moiety X, where X is a terminal vinyl or norbornene group reactive under polymerization conditions, Y is a chain transfer agent, Y' is a residue of Y, $R_1$ is a $C_1$ to $C_{10}$ substituted or unsubstituted, linear, branched, or cyclic alkyl or aryl, q is an integer in the range from 1-500, inclusive, and p is an integer in the range from 0-1,000, inclusive, comprising:
providing an alpha-olefin monomer;
providing a "T" reagent having the formula:

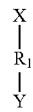

where X is a moiety having a terminal vinyl or norbornene group reactive under polymerization conditions, $R_1$ is $C_1$ to $C_{10}$ substituted or unsubstituted, linear, branched, or cyclic alkyl or aryl, and Y is a chain transfer agent;
providing a metallocene catalyst;
mixing the olefin monomer, the "T" reagent, and the catalyst in a container to yield a reaction mixture; and
allowing the reaction mixture to react under polymerization conditions for a period of time sufficient to form a long chain branching polymer.

2. The process of claim 1, wherein Y is a chain transfer agent comprising a moiety selected from the group consisting of: styrene, alkylbenzene, organoborane, organosilane, alkylaluminum, alkylzinc, and thiophene.

3. The process of claim 1, wherein the "T" reagent is selected from the group consisting of: p-(3-butenyl)styrene/hydrogen, p-(ethylnorborenyl)styrene/hydrogen, 5-hexenylalkylboron hydride, ethylnorborenylalkylboron hydride, 5-hexenyldialkylsilicon hydride, ethylnorborenyldialkylsilicone hydride and a combination thereof.

4. The process of claim 1, wherein the olefin monomer is an alpha-olefin monomer selected from the group consisting of: ethylene, propylene, 1-butene, 1-pentene, 1-hexene, 1-heptene, 1-octene, 1-nonene, 1-decene, 3-methyl-1-butene, 4-methyl-1-pentene, 3-methyl-1-pentene, 4-methyl-1-hexene, 3,3-dimethyl-1-butene, 4,4-dimethyl-1-hexene, norbornene, phenylnorbornene, indanylnorbornene, vinylidenenorbornene and a combination therof.

5. The process of claim 1, wherein the long chain branching polymer has a stereo-structure selected from the group consisting of: atactic, syndiotactic, isotactic, hemiisotactic and isotactic stereoblock.

6. The process of claim 1, wherein the reaction mixture further comprises a diluent.

7. The process of claim 6, wherein the diluent comprises a hydrocarbon selected from the group consisting of: an aliphatic hydrocarbon, an aromatic hydrocarbon and a combination thereof.

8. The process of claim 6, wherein the long chain branching polymer is formed as slurry particles in the reaction diluent.

9. The process of claim 1, further comprising a graft polymerization reaction of the long chain branching polymer and a monomer to yield a graft polymer.

10. The process of claim 9, wherein the graft polymerization reaction is selected from the group consisting of: a graft-from, a graft-onto and a graft-through polymerization reaction.

11. The process of claim 1, further comprising a cross-linking reaction of the long chain branching polymer to yield a cross-linked polymer.

12. The process of claim 1, further comprising a functionalization reaction of the long chain branching polymer to yield a polymer having a pendant functional group.

13. The process of claim 12, wherein the pendant functional group is selected from the group consisting of: OH, epoxy, $NH_2$, COOH, anhydride, Cl, Br and a combination thereof.

14. A process of synthesizing a long-chain branching olefin polymer, the process comprising:
   providing an olefin monomer;
   providing a metallocene catalyst;
   providing a T reagent having the formula:

$$X-R_1-Y$$

wherein X is an alpha olefin or norbornene moiety, $R_1$ is a $C_1$-$C_{10}$ linear, branched, or cyclic alkyl or aryl and where Y is a chain transfer agent; and
   co-polymerizing said olefin monomer and said T reagent.

15. The process of claim 14, wherein said synthesis is carried out in a single vessel.

16. The process of claim 14, wherein Y is a chain transfer agent comprising a moiety selected from the group consisting of: styrene, alkylbenzene, organoborane, organosilane, alkylaluminum, alkylzinc, and thiophene.

17. A long chain branching polypropylene having the formula:

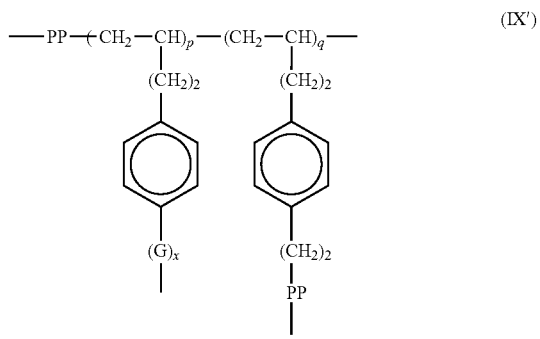

(IX')

where G is a vinyl monomer unit, x is an integer in the range of 150-10,000, inclusive, q is an integer in the range from 1-500, inclusive, and p is an integer in the range from 0-1,000, inclusive.

18. The polymer of claim 17, wherein the vinyl monomer G unit is selected from the group consisting of: an anion-polymerizable monomer and a radical polymerizable unit.

* * * * *

UNITED STATES PATENT AND TRADEMARK OFFICE
CERTIFICATE OF CORRECTION

PATENT NO.        : 7,511,105 B2  
APPLICATION NO. : 11/170698  
DATED             : March 31, 2009  
INVENTOR(S)       : Tze-Chiang Chung Page 1 of 1

It is certified that error appears in the above-identified patent and that said Letters Patent is hereby corrected as shown below:

Column 8, line 33, replace "(H)" with --(III)--

Column 20, line 51, replace "mi/min." with --ml/min.--

Signed and Sealed this

Ninth Day of June, 2009

JOHN DOLL  
*Acting Director of the United States Patent and Trademark Office*